(12) United States Patent
Zhyshko et al.

(10) Patent No.: US 10,142,788 B2
(45) Date of Patent: *Nov. 27, 2018

(54) SYSTEMS AND METHODS TO TRACK REGIONS VISITED BY MOBILE DEVICES AND DETECT CHANGES IN LOCATION PATTERNS

(71) Applicant: NinthDecimal, Inc., San Francisco, CA (US)

(72) Inventors: Yury Zhyshko, Minsk (BY); Veronica Milenkiy, Burlingame, CA (US); Elena Rose, Los Altos Hills, CA (US); Mark Christopher Dixon, Belmont, CA (US); Kevin Toshio Ching, Berkeley, CA (US); Keith Kilpatrick, San Francisco, CA (US)

(73) Assignee: NINTHDECIMAL, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,342

(22) Filed: Sep. 6, 2017

(65) Prior Publication Data

US 2017/0374521 A1    Dec. 28, 2017

Related U.S. Application Data

(63) Continuation of application No. 15/174,608, filed on Jun. 6, 2016, now Pat. No. 9,769,619, which is a
(Continued)

(51) Int. Cl.
*H04W 4/029* (2018.01)
*H04W 4/02* (2018.01)
(Continued)

(52) U.S. Cl.
CPC ............. *H04W 4/025* (2013.01); *G01S 19/42* (2013.01); *H04W 4/021* (2013.01); *H04W 4/029* (2018.02); *H04W 4/02* (2013.01)

(58) Field of Classification Search
CPC ....... H04W 4/02; H04W 4/021; H04W 4/028; H04W 4/025; H04W 4/04; H04W 4/043; H04W 4/046; H04W 64/00; H04W 64/003
(Continued)

(56) References Cited

U.S. PATENT DOCUMENTS 7,324,896 B1   1/2008 Smith
8,489,596 B1   7/2013 Milton et al.
(Continued)

OTHER PUBLICATIONS

Measuring Advertising Effectiveness, U.S. Appl. No. 14/295,067, filed Jun. 3, 2014, Mark Dixon, et al, Non Final Action, dated Dec. 2, 2016.
(Continued)

*Primary Examiner* — Jean Gelin
(74) *Attorney, Agent, or Firm* — Greenberg Traurig, LLP

(57) ABSTRACT

Systems and methods including mobile devices determining their location using a location determination system, such as a global positioning system. A database stores the identifiers of cells representative of predefined regions in a hierarchical grid system. The location coordinates as function of time are converted to visitation patterns of the mobile devices to the predefined regions, based on converting the coordinates to cell identifiers and searching the database to find matches between the cell identifiers representing the regions and the cell identifiers representing the mobile device locations. For example, mobile devices having similar visitation patterns can be identified and divided into two groups; and information relevant to a region is transmitted to one of the group but
(Continued)

not another. The visitation patterns of the two group after the transmission is identified and compared to measure a difference.

20 Claims, 15 Drawing Sheets

Related U.S. Application Data continuation of application No. 14/679,909, filed on Apr. 6, 2015, now Pat. No. 9,374,671.

(51) Int. Cl.
*H04W 4/021* (2018.01)
*G01S 19/42* (2010.01)

(58) Field of Classification Search
USPC .......... 455/456.1, 456.2, 456.3, 456.5, 404.2
See application file for complete search history.

(56) References Cited

U.S. PATENT DOCUMENTS

| | | | |
|---|---|---|---|
| 8,725,168 B2 | 5/2014 | Garcia et al. | |
| 8,768,876 B2 | 7/2014 | Shim et al. | |
| 8,792,909 B1 | 7/2014 | Xu et al. | |
| 8,880,097 B1 | 11/2014 | Xu et al. | |
| 9,307,360 B1 | 4/2016 | Zhyshko | |
| 9,374,671 B1 | 6/2016 | Zhyshko et al. | |
| 9,668,104 B1 | 5/2017 | Ching et al. | |
| 9,756,465 B2 | 9/2017 | Zhyshko | |
| 9,769,619 B2 | 9/2017 | Zhyshko et al. | |
| 9,967,714 B2 | 5/2018 | Ching et al. | |
| 9,986,527 B2 | 5/2018 | D'Alberto et al. | |
| 2002/0102992 A1 | 8/2002 | Koorapaty et al. | |
| 2003/0033273 A1 | 2/2003 | Wyse | |
| 2008/0248815 A1 | 10/2008 | Busch | |
| 2009/0198579 A1 | 8/2009 | Lewis et al. | |
| 2010/0306029 A1 | 12/2010 | Jolley | |
| 2010/0306032 A1 | 12/2010 | Jolley | |
| 2011/0163873 A1 | 7/2011 | McIntosh | |
| 2012/0166285 A1 | 6/2012 | Shapiro et al. | |
| 2012/0177010 A1* | 7/2012 | Huang | H04W 4/021 370/335 |
| 2012/0177025 A1* | 7/2012 | Huang | G01S 5/0236 370/342 |
| 2013/0002879 A1* | 1/2013 | Weber | G08B 13/2462 348/159 |
| 2013/0110583 A1 | 5/2013 | Ormont et al. | |
| 2013/0184006 A1* | 7/2013 | Yamaguchi | H04W 16/18 455/456.1 |
| 2013/0273968 A1 | 10/2013 | Rhoads et al. | |
| 2013/0339185 A1 | 12/2013 | Johnson | |
| 2014/0012806 A1 | 1/2014 | Ching et al. | |
| 2014/0031055 A1* | 1/2014 | Do | H04W 16/18 455/456.1 |
| 2014/0082008 A1 | 3/2014 | Johnson | |
| 2014/0195530 A1 | 7/2014 | Milton et al. | |
| 2014/0236669 A1 | 8/2014 | Milton et al. | |
| 2014/0302877 A1 | 10/2014 | Johnson | |
| 2014/0304038 A1 | 10/2014 | Milton et al. | |
| 2015/0019294 A1 | 1/2015 | Milton et al. | |
| 2015/0026181 A1 | 1/2015 | Milton et al. | |
| 2015/0149091 A1 | 5/2015 | Milton et al. | |
| 2015/0169695 A1* | 6/2015 | Karamchedu | G06F 17/30997 707/746 |
| 2015/0199699 A1 | 7/2015 | Milton et al. | |
| 2015/0348095 A1 | 12/2015 | Dixon et al. | |
| 2016/0091319 A1* | 3/2016 | Bonnell | H04W 4/02 701/461 |
| 2016/0205503 A1 | 7/2016 | Zhyshko | |
| 2016/0295371 A1 | 10/2016 | Zhyshko et al. | |
| 2017/0347231 A1 | 11/2017 | Zhyshko | |
| 2017/0347242 A1 | 11/2017 | Ching et al. | |
| 2017/0353826 A1 | 12/2017 | D'Alberto et al. | |
| 2017/0353941 A1 | 12/2017 | D'Alberto et al. | |

OTHER PUBLICATIONS

Systems and Methods to Identify a Predefined Geographical Region in Which a Mobile Device is Located, U.S. Appl. No. 15/676,871, filed Aug. 14, 2017, Diane Mizrahi, Non Final Action, dated Mar. 20, 2018.
Abadie, A. and Imbens, G. W. 2006. Large sample properties of matching estimators for average treatment effects. Econometrica 74, 1, 235267.
Abadie, A. and Imbens, G. W. 2008. On the Failure of the Bootstrap for Matching Estimators. Econometrica 76, 6, 1537-1557.
Abadie, A. and Imbens, G. W. 2009. Matching on the estimated propensity score. Working Paper 15301, National Bureau of Economic Research. August.
Austin, P. C. and Small, D. S. 2014. The use of bootstrapping when using propensity-score matching without replacement: a simulation study. Statistics in Medicine, n/a.
Dawid, A. P. 1979. Conditional Independence in Statistical Theory. Journal of the Royal Statistical Society. Series B (Methodological) 41, 1, 1-31.
Dehejia, R. H. and Wahba, S. 1998. Propensity score matching methods for non-experimental causal studies. Working Paper 6829, National Bureau of Economic Research. December.
D'Alberto, P. and Dasdan, A. 2009. Non-parametric information-theoretic measures of one-dimensional distribution functions from continuous time series. In SDM (Jun. 12, 2009). SIAM, 685-696.
Hansen, B. B. and Klopfer, S. O. 2006. Optimal full matching and related designs via network flows. Journal of Computational and Graphical Statistics 15, 3, 609-627.
Hartigan, J. A. and Wong, M. A. 1979. A k-means clustering algorithm. JSTOR: Applied Statistics 28, 1, 100-108.
Heinrich, C., Maffioli, A., and Vzquez, G. 2010. A primer for applying propensity-score matching. SPD Working Papers 1005, Inter-American Development Bank, Office of Strategic Planning and Development Effectiveness (SPD).
Ho, D., Imai, K, King, G., and Stuart, E. 2007. Matching as nonparametric preprocessing for reducing model dependence in parametric causal inference. Political Analysis 15, 199-236.
Jacus, S. M., King, G., and Porro, G. 2012. Causal inference without balance checking: Coarsened exact matching. Political Analysis 20, 1-24.
McCullagh, P. and Nelder, J. A. 1989. Generalized Linear Models, Second Edition. Chapman & Hall/CRC Monographs on Statistics & Applied Probability. Taylor & Francis.
Morgan, S. and Winship, C. 2007. Counterfactuals and Causal Inference: Methods and Principles for Social Research. Cambridge.
Rosenbaum, P. R. and Rubin, D. B. 1983. The central role of the propensity score in observational studies for causal effects. Biometrika 70, 41-55.
Sekhon, J. S. 2011. Multivariate and propensity score matching software with automated balance optimization: The Matching package for R. Journal of Statistical Software 42, 7, 1-52.
Shannon, C. 1948. A mathematical theory of communication. Bell System Technical Journal 27, 379-423, 623-656.
Author Unknown, Datalogic, A World-Class Producer of Bar Code Readers, Mobile Computers and Vision Systems Meeting all Automatic Data Capture and Data Collection Needs, May 18, 2014, retrieved from https://web.archive.org/web/20140518132818/http://www.datalogic.com/.
Author Unknown, Place Visit Rate (PVR™), Measures Real-World, In-Store ROI, Mar. 31, 2014, retrieved from https://web.archive.org/web/20140331032237/http://www.placeiq.com/products/place-visit-rate-pvr/.
Author Unknown, Placed Attribution, Connect Mobile Ads to In-Store Visits, Jun. 26, 2014, retrieved from https://web.archive.org/web/20140626122908/http://www.placed.com/attribution.
Author Unknown, RocketFuel, Audience Accelerator—Effortlessly Scale Your Audience with Spectacular Results, May 17, 2014,

(56) References Cited

OTHER PUBLICATIONS retrieved from https://web.archive.org/web/20140517004259*/http://rocketfuel.com/solutions/publishers.
Author Unknown, RocketFuel, Rocket Fuel's Advertising 2020, May 4, 2014, retrieved from https://web.archive.org/web/20140504000409*/http://rocketfuel.com/.
Global Area Reference System (GARS), http://earth-info.nga.mil/GandG/coordsys/grids/gars.html, retrieved on Nov. 13, 2014.
World Geographic Reference System (GEOREF), 2006.
United States National Grid (USNG), http://earch-info.nga.mil/GandG/coordsys/grids/usng.html, retrieved on Nov. 13, 2014.
Universal Transverse Mercator (UTM), the Military Grid Reference System (MGRS), and the Universal Polar Stereographic (UPS), http://earth-infonga.mil/GandG/coordsys/grids/universal_grid_system.html, retrieved on Nov. 13, 2014.
Wikipedia, Ordnance Survey National Grid, retrieved on Nov. 13, 2014.
Wikipedia, Universal Transverse Mercator coordinate system, retrieved on Nov. 13, 2014.

* cited by examiner

SYSTEMS AND METHODS TO TRACK REGIONS VISITED BY MOBILE DEVICES AND DETECT CHANGES IN LOCATION PATTERNS

RELATED APPLICATIONS

The present application is a continuation application of U.S. patent application Ser. No. 15/174,608, filed Jun. 6, 2016 and issued as U.S. Pat. No. 9,769,619 on Sep. 19, 2017, which is a continuation application of U.S. patent application Ser. No. 14/679,909, filed Apr. 6, 2015 and issued as U.S. Pat. No. 9,374,671 on Jun. 21, 2016, both entitled "Systems and Methods to Track Regions Visited by Mobile Devices and Detect Changes in Location Patterns", the entire disclosures of which applications are hereby incorporated herein by reference.

FIELD OF THE TECHNOLOGY

At least one embodiment of the disclosure relates to the determination of regions in which mobile devices are located in general and more specifically but not limited to, computational efficient ways to identify predefined regions in which mobile devices are located.

BACKGROUND

A location determination system, such as a Global Positioning System (GPS), allows a mobile device, such as a mobile phone, a smart phone, a personal media player, a GPS receiver, etc., to determine its current location on the earth. The location of the mobile device is typically calculated as a set of coordinates, such as the longitude and latitude coordinates of a point on the surface of the earth.

However, the location of the mobile device in the form of coordinates of a point on the surface of the earth does not provide sufficient information of interest about the location, such as whether the mobile device is within a particular region associated with a set of known properties.

For example, it may be of interest in certain applications to determine whether the location of the mobile device is within the store of a merchant, within the home of the user of the mobile device, within a recreation area, within a commercial district, etc.

For example, U.S. Pat. App. Pub. No. 2014/0012806, published Jan. 9, 2014 and entitled "Location Graph Based Derivation of Attributes", discusses the generation of a user profile based on mapping the locations of a mobile device to predefined geographical regions and use the attributes associated with the predefined geographical regions to derive and/or augment the attributes of the user profile.

For example, U.S. Pat. App. Pub. No. 2008/0248815, published Oct. 9, 2008 and entitled "Systems and Methods to Target Predictive Location based Content and Track Conversions", discusses the need to analyze the location of a mobile device to determine the types of businesses that the user of the mobile device typically visits, or visited. When the location of a mobile device is within a predefined distance from either the address of a particular business or a geographic location associated with the business, or within a geometric perimeter of the particular business location, it may be determined that the user of the mobile device was at the particular business.

Ray Casting is a known technology to determine whether a given point is within a polygon represented by a set of vertexes. However, Ray Casting is computational intensive involving floating point number computations.

The Military Grid Reference System (MGRS) is a standard used for locating points on the earth. It uses grid squares of various lengths at different resolutions, such as 10 km, 1 km, 100 m, 10 m, or 1 m, depending on the precision of the coordinates provided. An MGRS coordinate includes a numerical location within a 100,000 meter square, specified as n+n digits, where the first n digits give the easting in meters, and the second n digits give the northing in meters.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

One embodiment of the disclosure provides a computationally efficient method and system to determine whether a location of the mobile device is within a predetermined geographical boundary of a region and/or to determine, among a plurality of predefined regions, the identity of one or more regions within which the location of the mobile device is positioned.

Figure 1:
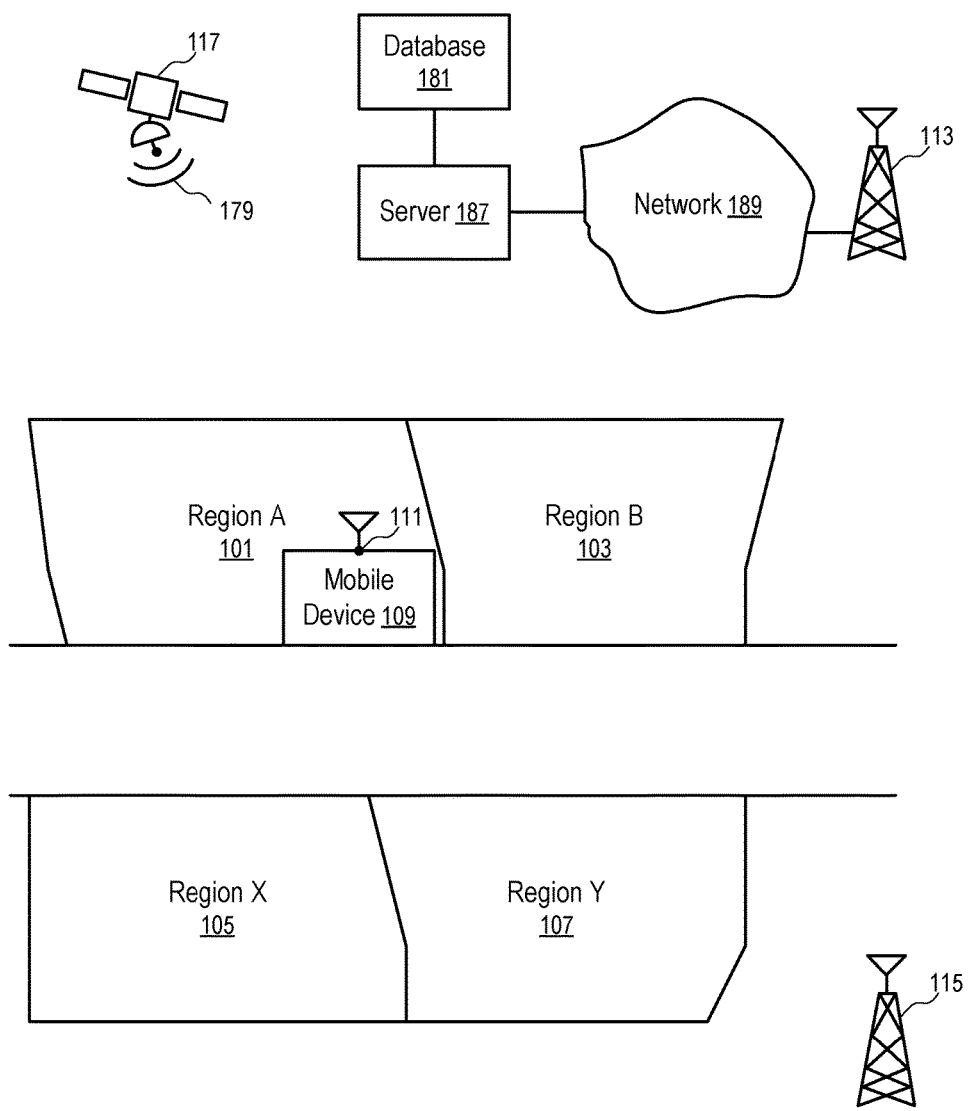
FIG. 1 shows a system to determine whether a mobile device is within a region having a predetermined geographical boundary according to one embodiment.

FIG. 1 shows a system to determine whether a mobile device is within a region having a predetermined geographical boundary according to one embodiment.

In FIG. 1, a location determination system uses the wireless signals (e.g., 179) transmitted to and/or from the mobile device (109) to determine the location (111) of the mobile device (109) on the surface of the earth.

For example, the location determination system may use Global Positioning System (GPS) satellites (e.g., 117) (and/or base stations (e.g., 115)) to provide GPS signals to the mobile device (109). The mobile device (109) is configured to determine the location (111) of the mobile device (109) based on the received GPS signals. In general, multiple GPS satellites (e.g., 117) and/or base stations (e.g., 115) are used to provide the wireless signals (e.g., 179) from different locations for a GPS receiver to determine its locations.

In FIG. 1, the mobile device (109) is configured with a cellular communications transceiver to communicate with the base stations (e.g., 113, 115) of a cellular communications network.

For example, in one embodiment, the mobile device (109) is configured to use signal delays in the cellular communications signals to or from a plurality of cellular base stations (e.g., 113, . . . , 115) to compute the location coordinates of the mobile device (109).

In FIG. 1, a server (187) is configured to communicate with the mobile device (109) via the network (189) and the cellular communications infrastructure (e.g., the base station (113)). The server (187) is connected to a database (181) storing information about the predefined regions (e.g., 101, 103, . . . 105, 107).

For example, the database (181) is configured to store the identifications of a set of cells that are within the boundary of a region (e.g., 101). The server (187) is configured to convert the location (111) of the mobile device (109) to a cell identification and search the identifications of the set of cells representing the region (101) to determine if the cell identification converted from the location (111) of the mobile device (109) is in the set of cell identifications representing the region (101). If the cell identification of the location (111) is found in the set of cell identifications representing the region (101), the location (111) is considered being within the boundary of the region (e.g., 101).

In one embodiment, a hierarchical grid system is used to construct cells that are within the boundary of the region (e.g., 101). Thus, the number of cells within the region (e.g., 101) can be reduced, while the precision of the determination can be selected at a desired level (e.g., 1 meter).

In one embodiment, the identifications of the cells are configured to be signed integer numbers. Thus, any known technologies for searching a given number within a set of signed integer numbers can be used to efficiently determine whether the cell identifier of a location (111) is within the set of cell identifiers of the region (101).

In one embodiment, the conversion of the location coordinates to a cell identifier is configured for improved computation efficiency. The cell identifier is also configured for efficient determination of the resolution of the grid in which the cell is located, the coordinates of the vertexes of the cell, the bounding boxes of the cell, and the identifications of the neighbors of the cells. Details and examples are provided below.

In one embodiment, a given region (e.g., polygon) on earth is represented by a set of cells in a hierarchical, regular grid in a longitude latitude space. In the longitude latitude space, the cells are uniform rectangles/squares at a given resolution; the cell identifies are constructed from the digits of the longitude/latitude coordinates for improved efficiency in conversion between coordinates and cell identifiers. In one embodiment, the resolution levels of the grids correspond to the precision of the longitude/latitude coordinates in terms of the number of digits used to after the decimal point to represent the longitude/latitude coordinates.

Figure 13:
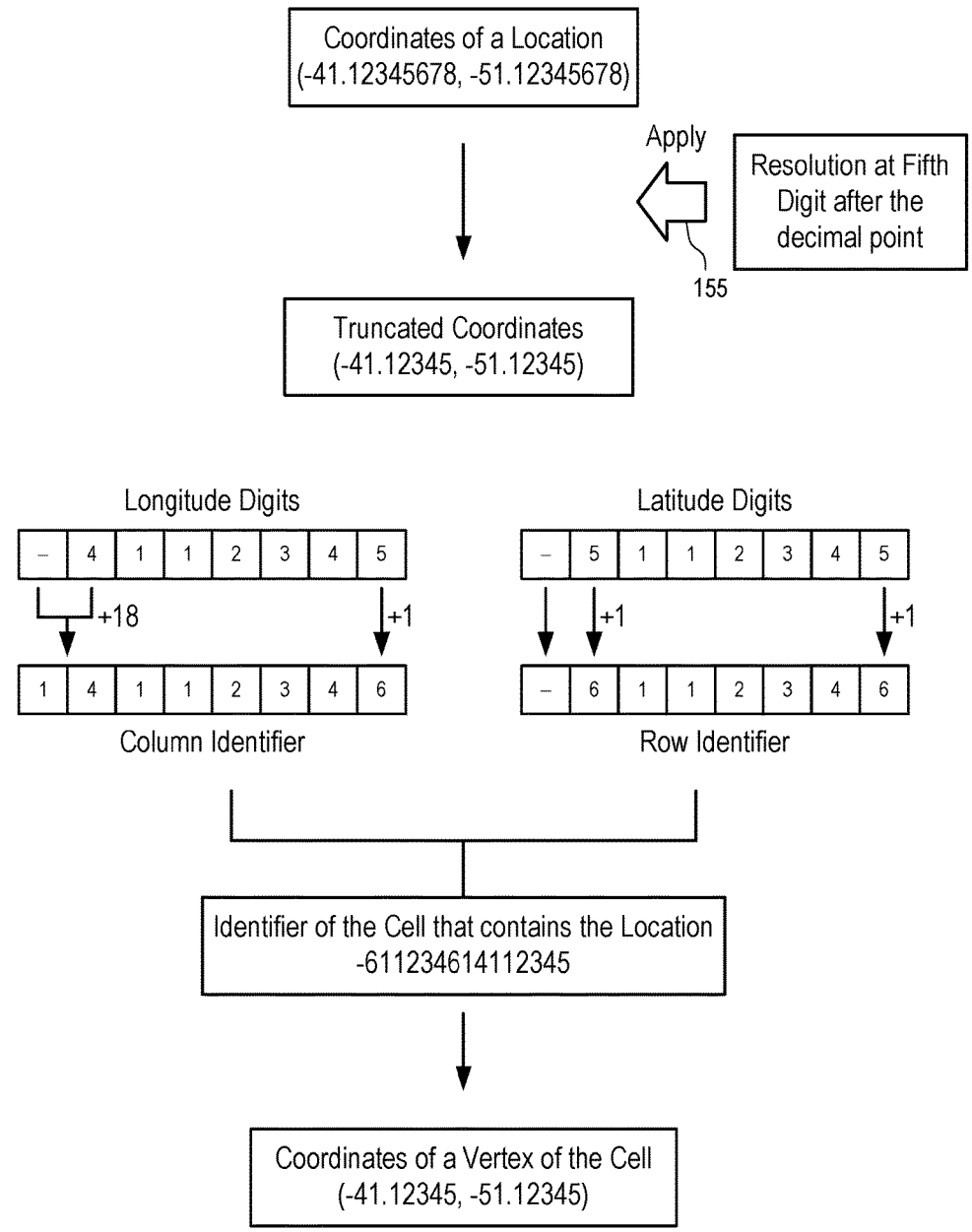
FIG. 13 illustrates an example of converting the coordinates of a location to an identifier of a cell and converting the identifier of the cell to the coordinates of a vertex of the cell according to one embodiment.

At a given resolution in the grid, the identity of the cell that contains a given point identified by a longitude/latitude pair can be computed via simple manipulations of the digits of the longitude/latitude pair, as illustrated in FIG. 13.

Figure 2:
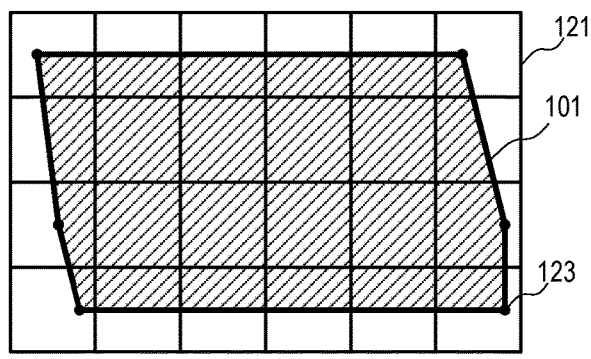
FIGS. 2-4 illustrate a grid system used to determine whether a location of a mobile device is within the geographical boundary of a region according to one embodiment.
Figure 3:
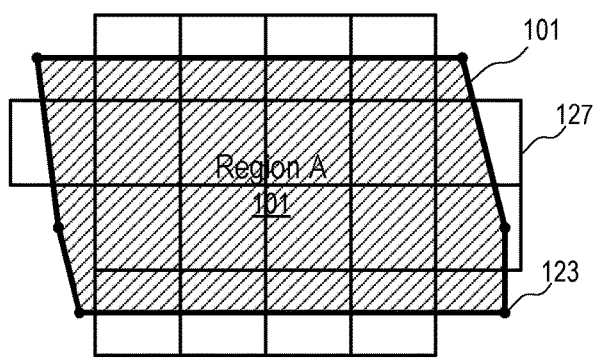
Figure 4:
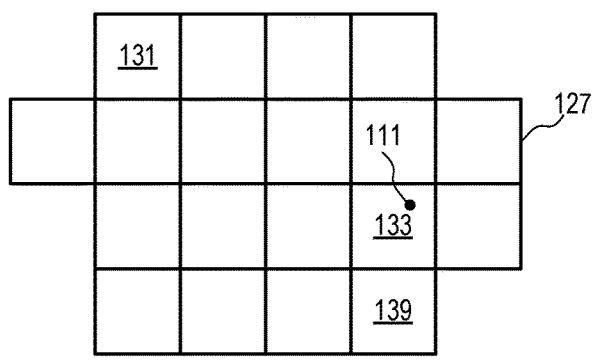

FIGS. 2-4 illustrate a grid system used to determine whether a location of a mobile device is within the geographical boundary of a region according to one embodiment.

In FIG. 2, a grid (121) of cells is used to identify an approximation of the region (101) at a given level of resolution of the grid (121). The resolution level corresponds to the size of the cells in the grid (121).

In FIG. 2, the region (101) is represented as a polygon having a set of vertexes (e.g., 123). The set of line segments connecting the neighboring vertexes (e.g., 123) of the region (101) defines the boundary of the region (101).

FIG. 3 illustrates the selection of a set of cells (e.g., 127) that are considered to be within the boundary of the region (101). Various different methods and/or criteria can be used to classify whether a cell is within the boundary of the region (101), especially the cells that are partially in the region (101) and contain a portion of the boundary of the region (101). The disclosure of the present application is not limited to a particular way to identify or classify whether a cell that is within the boundary of the region (101).

For example, a cell may be classified as being with the region (101) when the overlapping common portion between the cell and the region (101) is above a predetermined percentage of the area of the cell.

For example, a cell may be classified as being with the region (101) when a length of one or more segments of the region (101) going through the cell is above a threshold.

For example, the vertexes of the region (101) may be mapped to the nearest grid points to determine an approximation of the boundary of the region (101) that aligns with the grid lines to select the cells that are located within the approximated boundary of the region (101).

FIG. 4 illustrates the determination of the location (111) within the set of cells (131, . . . , 133, . . . , 139) according to one embodiment. In FIG. 4, each of the cells (131, . . . , 133, ..., 139) represents a portion of the region (101). To determine whether the location (111) is within the boundary of the region (101), the system is configured to determine whether the set of cells (131, ..., 133, ..., 139) contains the location (111).

In one embodiment, to efficiently determine whether any of the cells (131, ..., 133, ..., 139) contains the location (111), each of the cells (131, ..., 133, ..., 139) is assigned a cell identifier. In one embodiment, each of the cell identifier is a signed integer for improved computation efficiency; and the cell identifier is configured in such a way that the coordinates of any location within the cell can be manipulated via a set of predetermined, computationally efficient rules to provide the same cell identifier, as further illustrated in FIGS. 12 and 13.

In FIG. 4, after the coordinates of the location (111) is converted to the cell identifier of the cell (133) that contains the location (111), the system determines whether the location (111) is within the region corresponding to the set of cells (131, ..., 133, ..., 139) by searching in the cell identifiers of the set of cells (131, ..., 133, ..., 139) representative of the region (101) to find a match to the cell identifier of the cell (133) that is converted from the coordinates of the location (111). If a match is found, the location (111) is determined to be within the region (101); otherwise, the location (111) is determined to be outside of the region (101).

Figure 5:
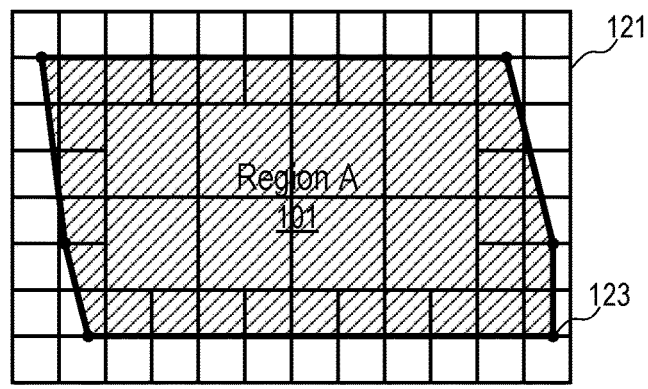
FIGS. 5-7 illustrate a hierarchical grid system used to determine whether a location of a mobile device is within the geographical boundary of a region according to one embodiment.
Figure 6:
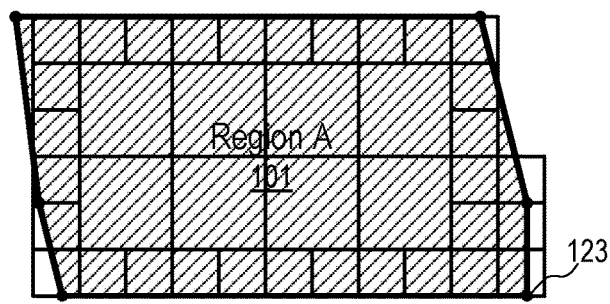
Figure 7:
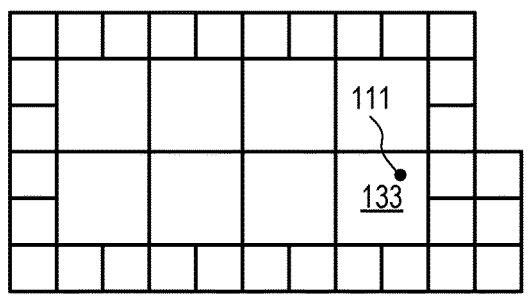

To improve the accuracy in the approximation of the region (101) and computational efficiency, the cells of a hierarchical grid system is used to approximate the region (101). FIGS. 5-7 illustrate a hierarchical grid system used to determine whether a location of a mobile device is within the geographical boundary of a region according to one embodiment.

In FIG. 5, grids of different resolutions are used to identify a set of cells to approximate the region (101). The grids has a predetermined hierarchy, in which the grid lines of a high level grid aligns with some of the grid lines of a low level grid such that the cells of the low level grid subdivide the cells of the high level grid. The grids of different resolutions have different cell sizes.

In general, a grid having a higher resolution and thus smaller cell size can approximate the region (101) in better precision, but uses more cells.

In one embodiment, the cells from the lower resolution grid is used in the interior of the region (101) to reduce the number of cells used; and the cells from the higher resolution grid is used near the boundary of the region (101) to improve precision in using the set of cells to approximately represent the region (101).

For example, in one embodiment, the lowest resolution gird is applied to identify a set of cells to approximate the region (101). The cells in the lowest resolution grid that contain the boundary of the region (101) are split in accordance with the grid of the next resolution level to identify cells in the grid of the next resolution level for improved precision in representing the region (101). The cell splitting process can be repeated for further improved precision using a higher resolution grid.

FIG. 6 illustrates the use of cells from two levels of hierarchical grids to approximate the region (101).

After the set of cells used to approximate the region (101) are identified (e.g., as illustrated FIG. 6), the system is configured to determine whether the location (111) of the mobile device (109) is within the region (101) based on whether any of the set of cells representing the region contains the location (111), in a way as illustrated in FIG. 7.

For example, in one embodiment, each of the cells used in FIG. 7 to represent a part of the region (101) is provided with a cell identifier. The coordinates of the location (111) is mapped to a cell identifier at a given resolution level. The system is configured to search in the set of cell identifiers of region (101) at the corresponding resolution level to determine whether there is a match to the cell identifier as determined from the coordinates of the location (111). If a match in cell identifier is found at any resolution level, the location (111) is determined to be within the region (101) represented by the set of cells; otherwise, the location (111) is determined to be outside the boundary of the region (101).

In one embodiment of FIG. 1, a hierarchical grid system is used to approximate the predefined regions (101, 103, ..., 105, 106) with cells. Each of the cells is classified/identified as being in one or more of the regions (101, 103, ..., 105, 106). The database (181) stores the identifiers of the cells in association with the identifies of the respective regions (101, 103, ..., 105, 106); and the server (187) is configured to compute the identifiers of the cells of different resolutions that contain the location (111) and determine if any of the cell identifiers stored in the database (181) in association with the identifiers of the regions (101, 103, ..., 105, 106) has the same cell identifier as the location (111). If a matching cell identifier is found, the location (111) of the mobile device (109) is determined to be with the respective region(s) (e.g., 101) associated with the corresponding cell identifier; otherwise, the location (111) is determined to be outside all of the regions (101, 103, ..., 105, 106) represented by the set of cell identifiers stored in the database (181).

Figure 8:
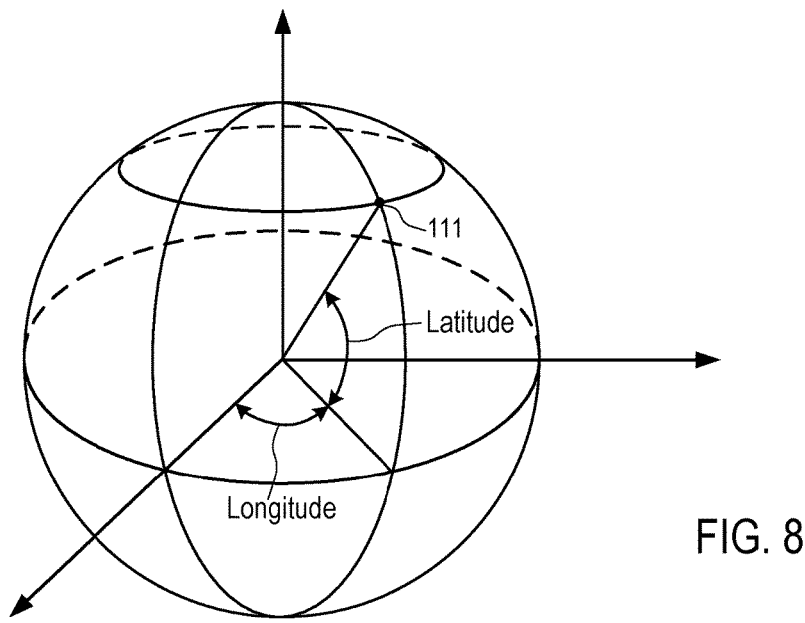
FIGS. 8 and 9 show a top level grid and the identification of cells within the grid according to one embodiment.
Figure 9:
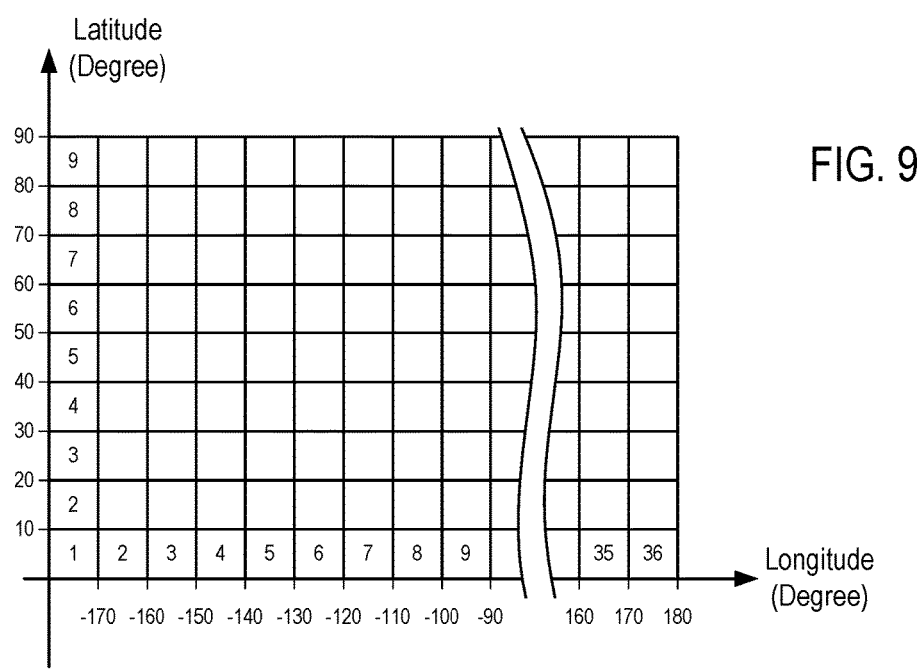

FIGS. 8 and 9 show a top level grid and the identification of cells within the grid according to one embodiment.

In one embodiment, the location (111) of the mobile device (109) is determined to be on the surface of the earth in terms of the longitude and latitude coordinates. In a coordinate system as illustrated in FIG. 8, the longitude coordinates are configured to be within the range of −180 degrees to 180 degrees; and the latitude coordinates are configured to be with the range of −90 degrees to 90 degrees.

In one embodiment, a hierarchical grid system on the surface of the earth is based on a regular grid in the longitude latitude space illustrated in FIG. 9.

In FIG. 9, the cells in the top level grid have a uniform size of 10 degrees in longitude and 10 degrees in latitude. In FIG. 9, the cells are identified by the row identifiers ranging from −9 to −1 and 1 to 9 and column identifiers ranging from 1 to 36.

In FIG. 9, the row and column identifiers are configured in a way to avoid using zero as a row identifier or a column identifier.

In FIG. 9, the row identifier of 1 is assigned to the row of cells between 0 to 10 degrees of latitude; the row identifier of 2 is assigned to the row of cells between 10 to 20 degrees of latitude; etc. The rows of cells between 0 to −90 degrees of latitudes are assigned similar row identifiers with a negative sign. For example, the row identifier of −1 is assigned to the row of cells between 0 to −10 degrees of latitude; the row identifier of −2 is assigned to the row of cells between −10 to −20 degrees of latitude; etc. As a result, the row identifier has a sign and a single digit for the top level cells illustrated in FIG. 9; and the single digit is not zero for any of the rows. Thus, for each location that is inside a cell in the top level grid as illustrated in FIG. 9, the row identifier of the cell containing the location has the same sign as the latitude coordinate of the location and the single digit that equals to 1 plus the tens digit of the latitude coordinate of the location.

In FIG. 9, the column identifier of 1 is assigned to the column of cells having longitude coordinates between −180 to −170 degrees; the column identifier of 2 is assigned to the column of cells having longitude coordinates between −170 to −160 degrees; etc. Thus, for each location that is inside a cell in the top level grid as illustrated in FIG. 9, the column identifier of the cell containing the location has no sign (e.g., the column identifier is always greater than zero) and one or two digits that correspond to adding 18 to a number formed by using the hundreds digit of the longitude as the tens digit and the tens digit of the longitude as the ones digit.

The combination of the row identifier and the column identifier of a cell uniquely identifies the cell within the top level grid as illustrated in FIG. 9. For example, the digits of the column identifier can be appended to the row identifier to generate a signed number that uniquely identifies the cell within the grid illustrated in FIG. 9. For a given cell identifier, the row identifier and the column identifier can be unambiguously deduced from the cell identifier itself, since the row identifier has a signal digit and a sign. The longitude and latitude coordinates of the vertexes of the cell can be computed from the row identifier and the column identifier.

Although FIG. 9 illustrates a preferred way to code the row identifiers and the column identifiers based on the longitude and latitude coordinates of the locations within the cells, alternative coding schemes can be used.

For example, the rows can be coded from 1 to 18 for latitudes from −90 degrees to 90 degrees; and the columns can be coded from 10 to 45 for longitudes from −180 degrees to 180 degrees. Thus, both the row and column identifiers are positive integers, while the column identifiers always have two digits.

For example, the rows can be coded from 11 to 28 for latitudes from −90 degrees to 90 degrees; and the columns can be coded from 11 to 46 for longitudes from −180 degrees to 180 degrees. Thus, both the row and column identifiers are positive integers having two digits.

Figure 10:
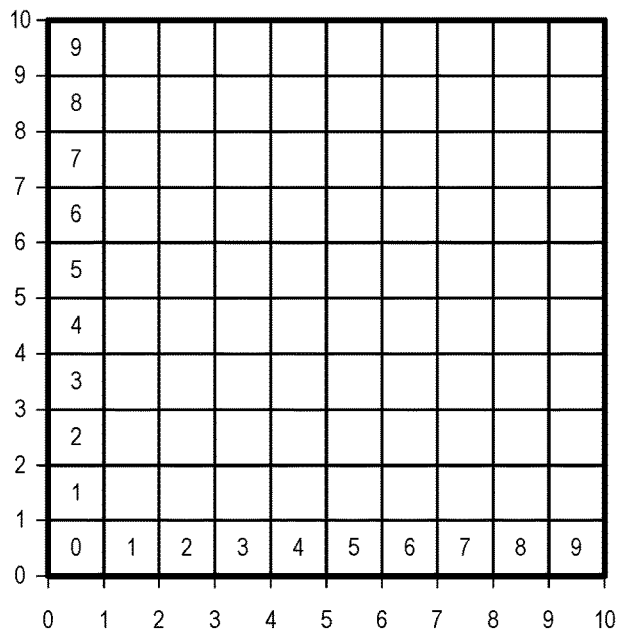
FIG. 10 shows an intermediate level grid and the identification of cells within the grid according to one embodiment.

FIG. 10 shows an intermediate level grid and the identification of cells within the grid according to one embodiment. In FIG. 10, a given cell at a higher level grid (e.g., a cell in the top level grid as illustrated in FIG. 9) is subdivided into 10 rows and 10 columns. The coding of the rows and columns correspond to the measurement directions of the longitude and latitudes coordinates such that the corresponding digits in the longitude and latitudes coordinates at a given precision level can be used directly as the row and column identifiers of the sub-cells within the cell at the higher level grid.

For example, when the cell that is being subdivided into the 10 rows and 10 columns has a size of 10 degrees in longitude and 10 degrees in latitude (e.g., as illustrated in FIG. 9), the row identifier and column identifier of the sub-cells correspond to the ones digit of the latitude and longitude coordinates of the points within the respective sub-cells.

For example, when the cell that is being subdivided into the 10 rows and 10 columns has a size of 1 degree in longitude and 1 degree in latitude, the row identifier and column identifier of the sub-cells correspond to the one-tens digit of the latitude and longitude coordinates of the points within the respective sub-cells.

Figure 11:
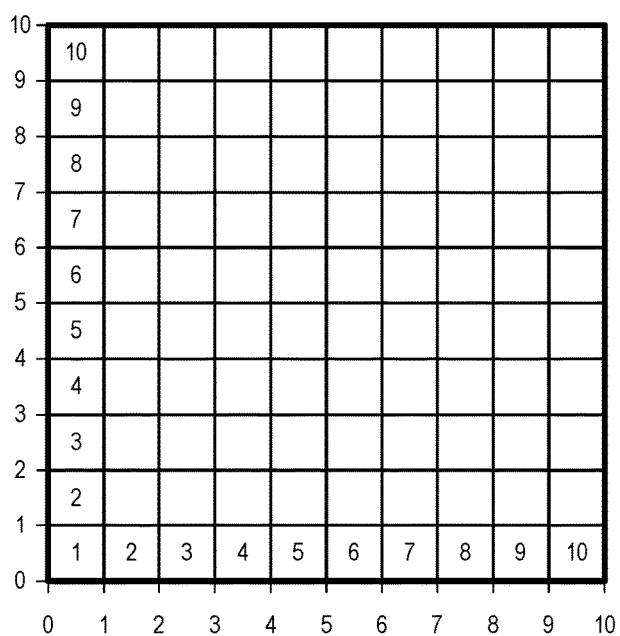
FIG. 11 shows the identification of cells within a grid having the finest resolution in a grid hierarchy according to one embodiment.

FIG. 11 shows the identification of cells within a grid having the finest resolution in a grid hierarchy according to one embodiment. In FIG. 11, the row identifiers and column identifiers are padded by 1, in comparison with the row and column coding scheme illustrated in FIG. 10.

In one embodiment, an identifier cell for a given resolution includes sufficient information to identify the corresponding cells in the higher level grid(s) that contains the cell. Thus, a cell identifier uniquely identifies a cell in the entire hierarchical grid without ambiguity.

Figure 12:
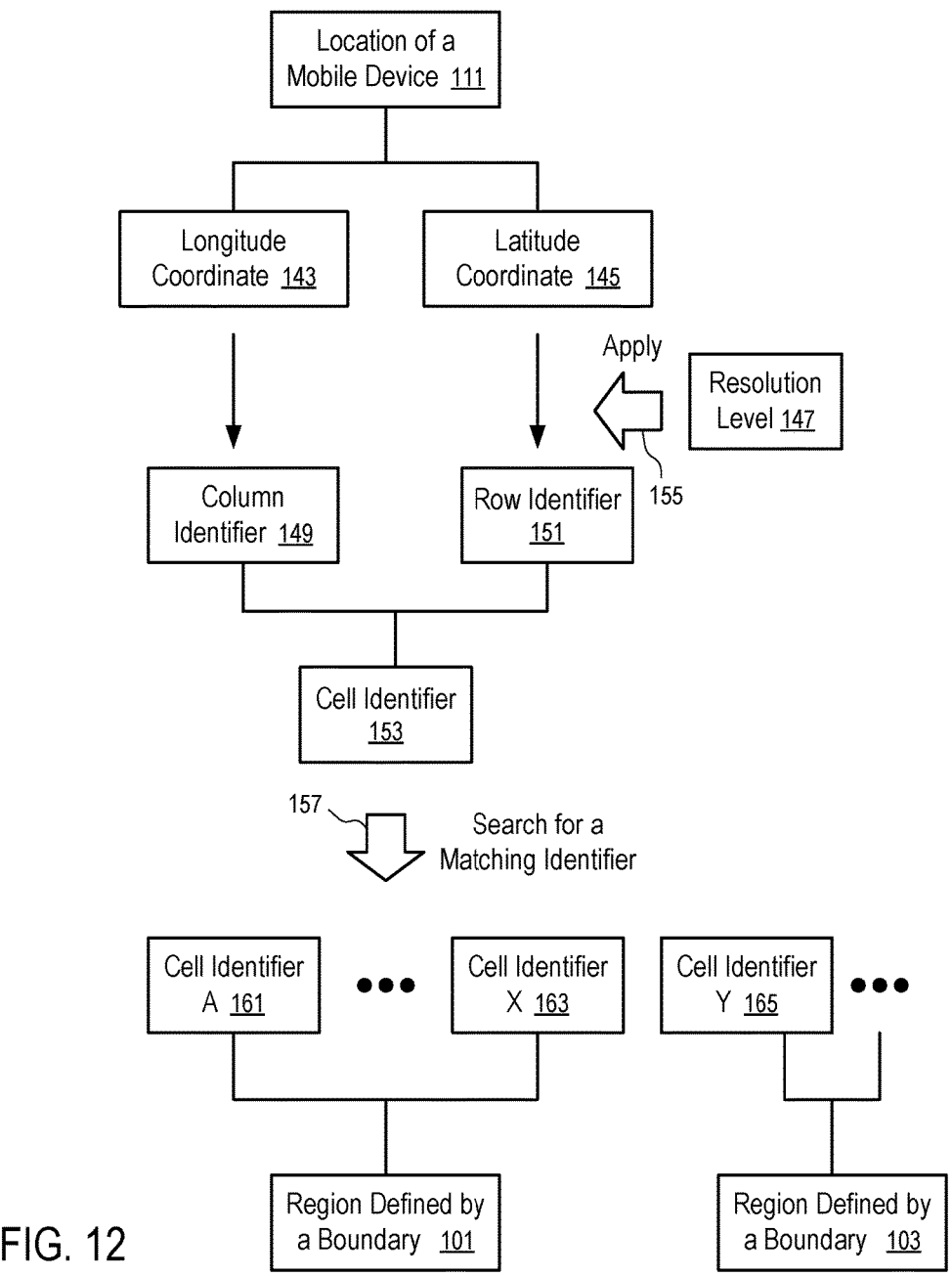
FIG. 12 shows the method to determine whether a location of a mobile device is within the geographical boundary of a region according to one embodiment.

FIG. 12 shows the method to determine whether a location of a mobile device is within the geographical boundary of a region according to one embodiment.

In FIG. 12, the location (111) of the mobile device (109) is determined in terms of the longitude coordinate (143) and the latitude coordinate (145).

For a given resolution level (147), the longitude coordinate (143) and the latitude coordinate (145) are truncated to generate the column identifier (149) and the row identifier (151). Applying (155) the resolution level (147) includes truncating the longitude coordinate (143) and the latitude coordinate (145) to the corresponding digits of precision to generate the column identifier (149) and the row identifier (151). In one embodiment, the digits corresponding to the top level grid and the bottom level grid at the given resolution are adjusted according to FIGS. 9 and 11.

In FIG. 12, the column identifier (149) and the row identifier (151) are combined to generate the cell identifier (153) of the location (111) of the mobile device at the given resolution level (147).

In one embodiment, the database (181) stores a set of cell identifiers (161, . . . , 163) that are associated with the region (101) defined by a predetermined boundary. The server (187) searches (157) the set of cell identifiers (161, . . . , 163) to find a match with the cell identifier (153). If a match is found, the location (111) of the mobile device (109) is determined to be within the boundary of the region (101).

In one embodiment, the database (181) stores a set of cell identifiers (e.g., 161, . . . , 163, 165, . . . ) associated with respective different regions (e.g., 101, 103, . . . ). When the cell identifier (153) of the location (111) of the mobile device (109) is found to be matching with a particular cell identifier (e.g., 163 or 165), the region (e.g., 101 or 103) associated with the particular cell identifier (e.g., 163 or 165) is determined to be the region in which the mobile device (141) is located.

In one embodiment, when a cell contains the boundary of two regions (e.g., 101 and 103), the cell identifier of the cell can be associated with both regions (e.g., 101 and 103). The system may optionally further determine which region the cell is in based on the coordinates of the vertexes defining the boundary (or other parameters that define the boundary between the regions).

FIG. 13 illustrates an example of converting the coordinates of a location to an identifier of a cell and converting the identifier of the cell to the coordinates of a vertex of the cell according to one embodiment.

In FIG. 13, the location has a latitude coordinate of −51.12345678 and a longitude coordinate of −41.12345678. A resolution at the fifth digit after the decimal point is applied to the coordinates to generate the truncated coordinates (−41.12345, −51.12345). The decimal point is removed to obtain the longitude digits −4112345 and the latitude digits −5112345. Since the length of the equator of the earth is about 40,075 km, the cell size near the equator is about 1.11 meters at the resolution corresponding to the fifth digit.

In accordance with the scheme for the top level grid illustrated in FIG. 9, the tens digit for the latitude coordinate is padded with one (without considering the sign of the latitude); and the hundreds digit and tens digit, including the sign, of the longitude coordinate is padded with 18 to generate the row identifier −6 and the column identifier 14 for the top level grid.

In accordance with FIG. 10, the row identifiers and column identifiers of the sub-cells in the hierarchical grid correspond to the respective latitude digits and longitude digits (1, 1, 2, 3, 4).

In accordance with FIG. 11, the row identifiers and column identifiers of the sub-cells in the bottom hierarchy is padded with 1, if the longitude and/or the latitude coordinates of the location is not exactly on the grid lines of the resolution level (e.g., if the longitude or latitude coordinate has nonzero digits after the fifth digit behind the decimal point). One is not padded at the last digit when the longitude and/or the latitude coordinates of the location is exactly on the grid lines of the resolution level (e.g., if the longitude or latitude coordinate has no nonzero digits after the fifth digit behind the decimal point). According to this padding scheme, in the northern hemisphere locations on the northern edge of a cell are included in the cell but not the locations on the southern edge. In the southern hemisphere, locations on the southern edge of a cell are included in the cell but not the locations on the northern edges. Locations on the eastern edge of a cell are included in the cell, but not the western edge.

Thus, the location (−41.12345678, −51.12345678) has the row and column identifiers −6112346 and 14112346. The digits of the column identifier are appended to the digits of the row identifier to generate the cell identifier −611234614112346.

In FIG. 13, the row and column identifiers can be recovered from the cell identifier. The number of digits in the cell identifier divided by 2 provides the number of leading digits for the row identifier; and the remaining digits are for the column identifier. From the row identifier and column identifiers, the latitude digits and longitude digits can be computed via subtraction of the respective padding. The truncated coordinates can be computed from the latitude digits and longitude digits respectively, which can be used to determine the coordinates of a vertex of the cell as (−41.12345, −51.12345). Based on the resolution of the cell being at 0.00001, the coordinates of other vertexes of the cell can be determined as (−41.12346, −51.12345), (−41.12346, −51.12344), (−41.12345, −51.12344). The bounding box of the cell and the neighboring cells can also be easily identified based on the coordinates.

FIG. 13 illustrates a way to append the digits of the column identifier to the digits of the row identifier to generate the cell identifier. Alternatively, the row identifier and the column identifier can be combined in other ways that can be reversed to derive the row identifier and the column identifier from the cell identifier.

For example, when the top level column identifiers are mapped to the range 11 to 46 to have a fixed number of two digits for the top level column, the column identifier is 2411236. Since there is no ambiguity in the number of digits used to represent the top level column, the top level column identifier (24) can be appended after the top level row identifier (−6), which is then appended with the row and column identifiers of the next level, and so on. Thus, a cell identifier of −6241111223366 can be generated, with the sign then the first three digits representing the top level row and column, and two digits for subsequent next level row and column to identifying the subdivision within the higher level cell.

In some embodiments, the row and column identifiers of the bottom level are not padded in a way illustrated in FIG. 11 to have different ways to account for the locations on grid lines at the lowest level resolution.

FIGS. 9-11 and 13 illustrate a grid hierarchy based on a decimal representation of longitude and latitude coordinates. Alternatively, the grid hierarchy can be constructed in accordance with longitude and latitude coordinates expressed using other bases, such as binary, ternary, quintal, octal, duodecimal, etc. in a similar way.

Further, in some embodiments, the longitude and latitude coordinates may be normalized (e.g., in the standardized data range between 0 to 1); and the grids can be constructed in the space of the normalized longitude and latitude coordinates.

The hierarchical grid can also be extended to a three-dimensional space. For example, a hierarchical grid can be constructed with regular grids in the longitude, latitude, altitude space, or in a mapped or normalized longitude, latitude, and altitude space.

Figure 14:
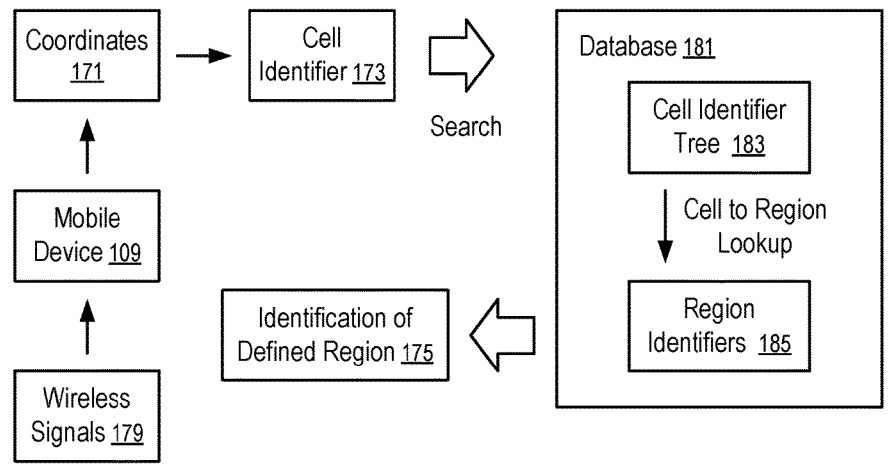
FIG. 14 shows a system configured to map a location of a mobile device to one or more identifications of regions according to one embodiment.

FIG. 14 shows a system configured to map a location of a mobile device to one or more identifications of regions according to one embodiment. In FIG. 14, the mobile device (109) determines the coordinates (171) of its location (111) based on the wireless signals (179) to and/or from a location determination system, such as the Global Positioning System (GPS).

The coordinates (171) are converted to a cell identifier (173) of a cell that contains the location, e.g., in a way as illustrated in FIG. 12 or 13.

In the database (181), a set of cell identifiers are stored in association with region identifiers (185), where each of the cell identifiers is associated with one or more of the respective regions when the respective cell contains at least a portion of the one or more of the respective regions.

In one embodiment, the set of cell identifiers are organized as a cell identifier tree (183) to facilitate the search of a matching identifier.

For example, the cell identifier tree (183) can be constructed as a self-balancing tree for efficient searching of a cell identifier matching the cell identifier (173) generated from the coordinates (171) of the mobile device (109).

In general, any methods to search for an identifier with a set of predetermined identifiers can be used to search for the matching cell identifier (173).

From the association of the cells with the region identifiers (185) in the database, the server (187) determines the identification (175) of the one or more defined regions that are at least partially in the cell identified by the cell identifier (173). Thus, the location (111) of the mobile device (109) is determined to be within the region(s) identified by the identification (175) of the defined region(s).

Similarly, after regions of different sizes and locations are represented via the cells in the hierarchical grid, the system can be configured to efficiently compute overlapping portions of regions via searching for cells having the same identifications.

For example, to determine the approximate overlapping between regions, the percentage of overlapping, the square of overlap, etc., the system is configured to count a number of overlapped cells to determine the overlapping.

In one embodiment, a polygon or any other shape is approximated by a set of rectangular and/or square cell of different sizes in a suitable coordinate system (e.g., in longitude latitude space). Each cell is represented by a single number as identifier. The identifiers of the cells used to approximate the polygon or shape can be organized as a binary tree, a self-balanced tree, a Red/Black Tree, or other structures that are known to provide logarithmic search time to improve the computation efficiency in determining whether a point is within the polygon or shape.

For example, a polygon representing the boundary of United States of America USA on a map may include 2,000 vertexes. The Ray Casting algorithm has O(n) complexity to calculate if a point is within the polygon. When this polygon is approximated via a hierarchical grid system discussed above, the polygon can be represented 700 to 2,000,000 cells in the longitude latitude space, depending on the required precision. When the polygon is represented by 2,000,000 cells and their corresponding identification numbers, searching a matching identifier at the same precision via a binary tree gives log(2,000,000)=21 complexity, which is much less than 2,000. Thus, the present disclosure improves the computational efficiency of identifying a region in which a mobile device is located.

Figure 16:
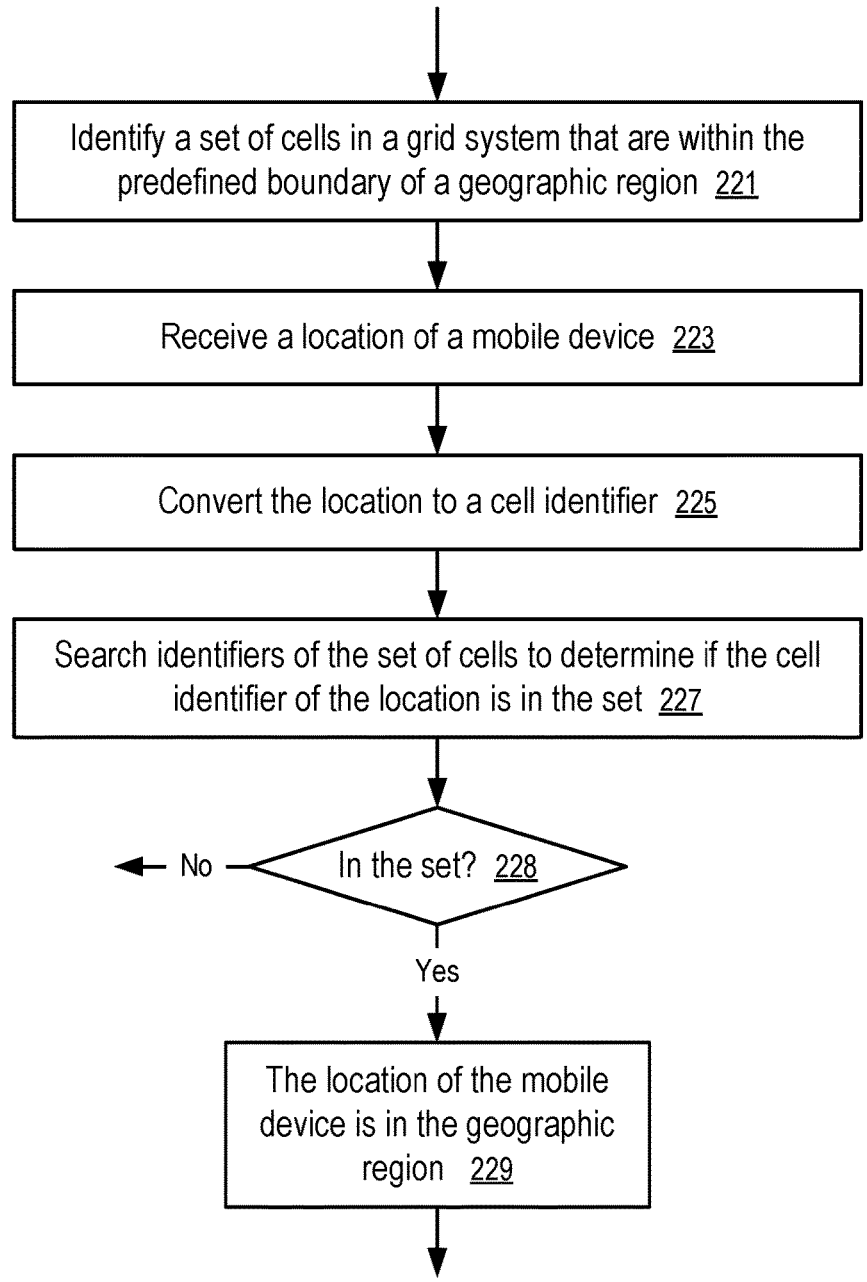
FIG. 16 shows a method of mapping a location of a mobile device to a region according to one embodiment.

FIG. 16 shows a method of mapping a location of a mobile device to a region according to one embodiment. For example, the method of FIG. 16 can be implemented in the system of FIG. 1 and/or FIG. 14, using the grid system illustrated FIGS. 2-8, and/or the grid system and cell identifier system illustrated in FIGS. 8-13.

In FIG. 16, a computing apparatus is configured to: identify (221) a set of cells in a grid system that are within the predefined boundary of a geographic region; receive (223) a location (111) of a mobile device (109); convert (225) the location (111) to the identifier of a cell that contains the location; and search (227) identifiers of the set of cells to determine if the cell identifier of the location (111) is in the set. If it is determined (228) that the cell identifier of the location (111) is in the set, the computing apparatus determines (229) that the location (111) of the mobile device (109) is in the geographic region.

In one embodiment, the computing apparatus includes at least one of: the database (181) and the server (187).

In one embodiment, the database (181) is configured to store an identifier of a geographical region (101) having a predefined geographical boundary defined by a set of vertexes (e.g., 123) or a set of other parameters, such as a center location and a radius.

The database (181) further stores a set of cell identifiers, each of which identifies a cell that is determined to be within the predefined geographical boundary of the geographical region (101).

After the server (187) receives, from a mobile device (109), a location (111) of the mobile device (109), the server (187) converts a set of coordinates (143, 145) of the location (111) of the mobile device (109) to a cell identifier (153) of a cell that contains the location (111). In some embodiments, the mobile device (109) generates the cell identifier (153) at a desired precision level to represent the location (111) of the mobile device (109).

The server (187) determines whether the location (111) of the mobile device (109) is within the geographical region (101) based on searching the set of cell identifiers to determine if the set has the cell identifier (153) computed from the coordinates (143, 145) of the location (111) of the mobile device (109).

In one embodiment, to convert the set of coordinates (143, 145) of the location (143, 145) to the cell identifier (153), the server (187) (or the mobile device (109)) generates two integers from longitude and latitude coordinates of the location (111) of the mobile device (109) according to a precision level (e.g., resolution level (147), and combine the two integers into the first cell identifier (153) without using a floating point number computation.

In one embodiment, each cell using the in the system to approximate the regions and the locations is a rectangle/square area in a longitude latitude space of locations on the earth. The size of the cell can be unambiguously determined from the cell identifier itself. Further, the longitude and latitude coordinates of corners of the cell identified by the cell identifier can be unambiguously determined from the cell identifier itself.

In one embodiment, the set of cells identified by the set of cell identifiers to approximate one or more regions (e.g., 101, 103, . . . , 105, . . . , 107) has a plurality of different cell sizes that correspond to a plurality of predetermined cell resolution levels. Each of the plurality of predetermined cell resolution levels corresponds to a predetermined precision level of longitudes and latitudes of locations on the earth. For example, each of the plurality of predetermined cell resolution levels corresponds to a precision to a predetermined digit after the decimal point in longitude and latitude coordinates of locations on the earth.

In one embodiment, a cell identifier itself includes sufficient information to determine the resolution level of the cell, the coordinates of the vertexes of the cell, and the identifiers of the neighboring cells, etc.

In one embodiment, the database (181) stores data mapping each cell identify in the set of cell identifiers to at least one region identifier, where the cell contains a least a part of each of the regions identified by the at least one region identifier. The server (187) is configured to search the set of cell identifiers to find a cell identifier that matches with the cell identifier (153) computed from the location (141) and thus determine at least one region identifier associated with the matching cell identifier.

For example, in one embodiment, the set of coordinates of the location (111) includes longitude (143) and latitude (145) of the location (111). To converting the coordinates (143, 145) to the cell identifier (153), the server (187) (or the mobile device (109)) selects digits from the longitude (143) and the latitude (145) of the location (111) in accordance with a cell resolution level (147) and combines the digits selected from the longitude (143) and the latitude (145) of the location (111) into an integer representing the cell identifier (153) of the location (111).

As illustrated in FIG. 13, selecting the digits from the longitude and the latitude includes: selecting digits from integer part of the longitude and a first number of digits from the longitude after the decimal point of the longitude to form an integer representation of the longitude at the cell resolution level; and selecting digits from integer part of the latitude and the same first number of digits from the latitude after the decimal point of the latitude to form an integer representation of the longitude at the cell resolution level.

In one embodiment, to generate the column identifier and row identifier of the location (111), a predetermined number (e.g., one) is added to a digit of the integer representation of the latitude that corresponds to the tens digit of the latitude; and a sign is provided to the integer representation of the latitude according to the sign of the latitude.

In one embodiment, after providing a sign to the integer representation of the longitude according to the sign of the longitude, a predetermined number (e.g., eighteen) is added to digits of the integer representation of the longitude that corresponds to the hundreds digit and tens digit of the longitude, in view of the sign provided to the integer representation of the longitude.

In one embodiment, when the latitude coordinate has a non-zero portion that is discarded during the selection of the latitude digits for the integer representation of the latitude, one is added to the ones digit of the integer representation of the latitude without considering the sign of the integer representation of the latitude. When the longitude coordinate has a non-zero portion that is discarded during the selection of the longitude digits for the integer representation, one is added to the ones digit of the integer representation of the longitude without considering the sign of the integer representation of the longitude.

In one embodiment, after the server (187) receives data representing the predefined geographical boundary of the geographical region, such as the coordinates of the vertexes of a region having a polygon shape, the coordinates of the center and the radius of a region having a circular shape, etc., the server (187) identify, in a hierarchy of cell grids, the set of cell identifiers that are determined to be within the predefined geographical boundary.

In one embodiment, when the set of cells being searched having different resolutions (cell sizes), the location (111) of the mobile device (109) is converted to a plurality of cell identifiers at the corresponding resolutions; and the server (187) is configured to search a match of any of the cell identifiers at the corresponding resolutions computed from the location (111) of the mobile device (109).

For example, the identifiers of the cells of different sizes/resolutions to represent the regions can be organized in a single tree; and the identifiers of the location (111) of the mobile device (109) of corresponding sizes/resolutions can be searched concurrently or one after another to find a match.

For example, the identifiers of the cells of different sizes/resolutions to represent the regions can be organized in separate trees according to cell sizes/resolutions; and the identifiers of the location (111) of the mobile device (109) of corresponding sizes/resolutions can be searched concurrently or one after another in the respective trees for corresponding sizes/resolutions.

In one embodiment, each grid in the hierarchy of cell grids corresponds to a rectangle/square grid in longitude latitude space of locations on the earth with a predetermined resolution level that corresponds to a precision level in a floating point decimal representation of longitude and latitude coordinates.

Figure 15:
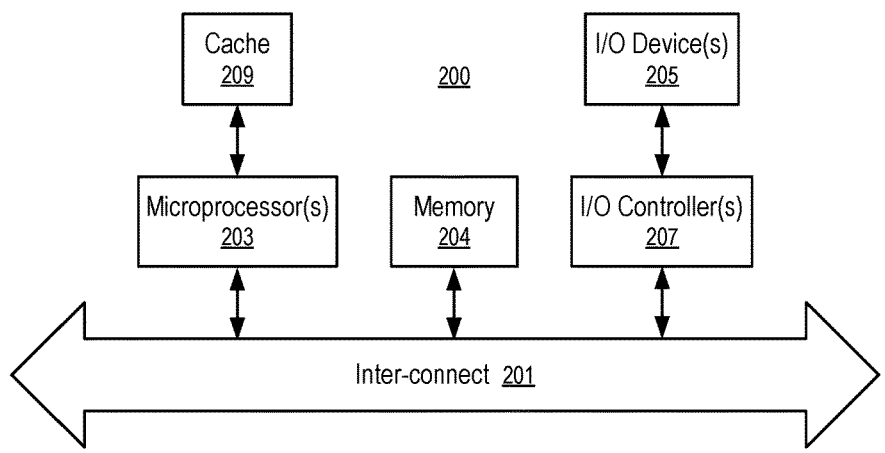
FIG. 15 illustrates a data processing system according to one embodiment.

The server (187) and/or the database (181) can be implemented as a computer apparatus in the form of a data processing system illustrated in FIG. 15.

In one embodiment, the techniques disclosed above are used to map location histories of mobile devices into visitation histories of the mobile devices to one or more predefined regions. The visitation patterns of the mobile devices can be used to identify mobile devices having similar behaviors and/or different behaviors in relation with locations. For example, the differences in behaviors following an event between mobile devices that are associated with the event and mobile devices that are not associated with the event can be measured as an influence of the event, if the mobile devices have the same or similar behaviors prior to the event.

For example, the mobile devices initially having similar behavior profiles may have different behaviors after some of the mobile devices are provided with an advertisement and others are not. Thus, the difference can be detected as a measurement of the influence/effectiveness of the advertisement.

Figure 17:
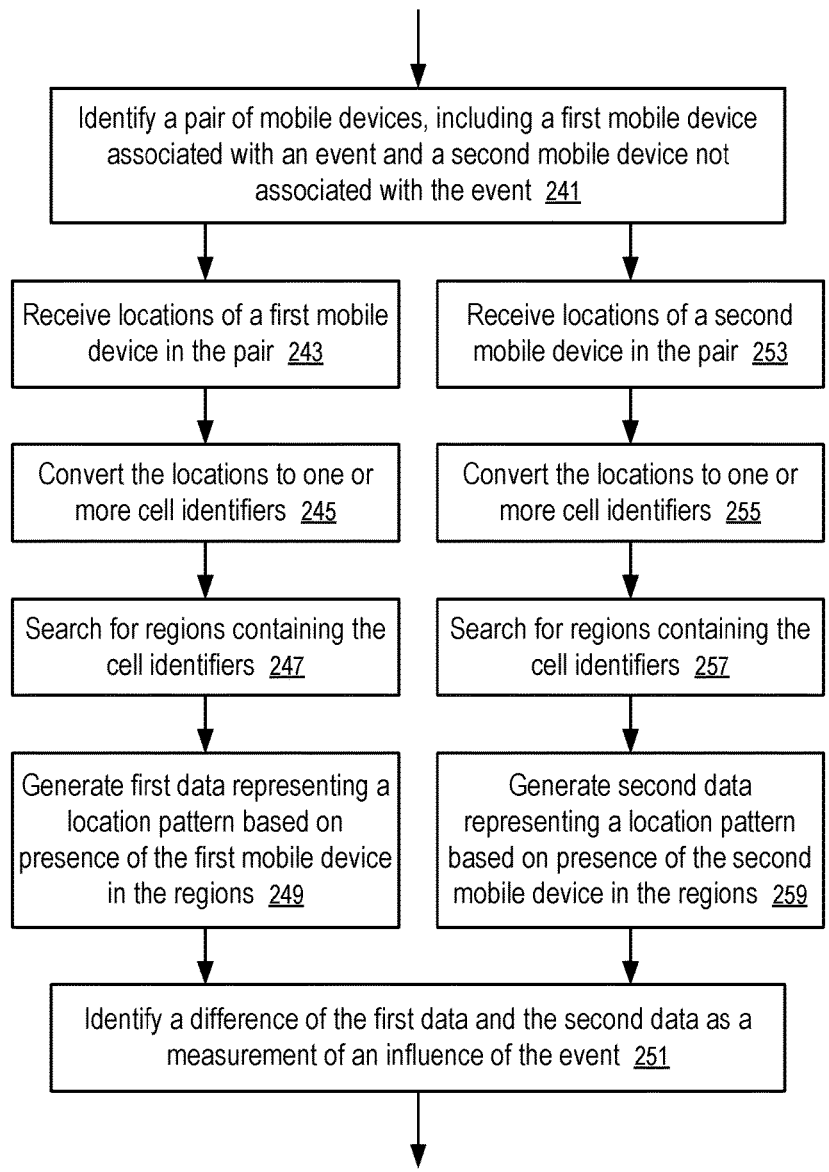
FIG. 17 shows a method to detect differences in location patterns according to one embodiment.

FIG. 17 shows a method to detect differences in location patterns according to one embodiment.

In FIG. 17, the server (187) is configured to identify (241) a pair of mobile devices, including a first mobile device associated with an event and a second mobile device not associated with the event, to measure the influence of the event.

For the first mobile device, the server (187) is configured to: receive (243) locations of the first mobile device; convert (245) the locations to one or more cell identifiers; search (247) for regions containing the cell identifiers; and generate (249) first data representing a location pattern based on presence of the first mobile device in the regions.

For the second mobile device, the server (187) is similarly configured to: receive (253) locations of the second mobile device; convert (255) the locations to one or more cell identifiers; search (257) for regions containing the cell identifiers; and generate (259) second data representing a location pattern based on presence of the second mobile device in the regions.

The server (187) identifies (251) a difference of the first data and the second data as a measurement of an influence of the event. Preferably, the pair of mobile devices have similar attributes and/or location patterns prior to the event. Alternatively, the change in location patterns of the first mobile device before and after the event can be compared to the change in location patterns of the second mobile device before and after the event to measure the influence of the event.

For example, the pair of mobile devices may be initially identified to have similar profiles in location patterns and/or other attributes, such as the demographic data of their users, the propensity scores of their users, etc. After the event of an advertisement being transmitted to the user of the first mobile device but not the user of the second mobile device, the difference in the location patterns represents a measurement of the influence/effectiveness of the advertisement in changing location/visitation patterns.

Further, the differences in other attributes associated with the pair of mobile devices can be determined as measurements of the influence/effectiveness of the advertisement with respect to corresponding attributes. Examples of such attributes include the enrollment in a program or service, visitation to certain websites, foot traffic to a store, web traffic to a website, etc.

Figure 18:
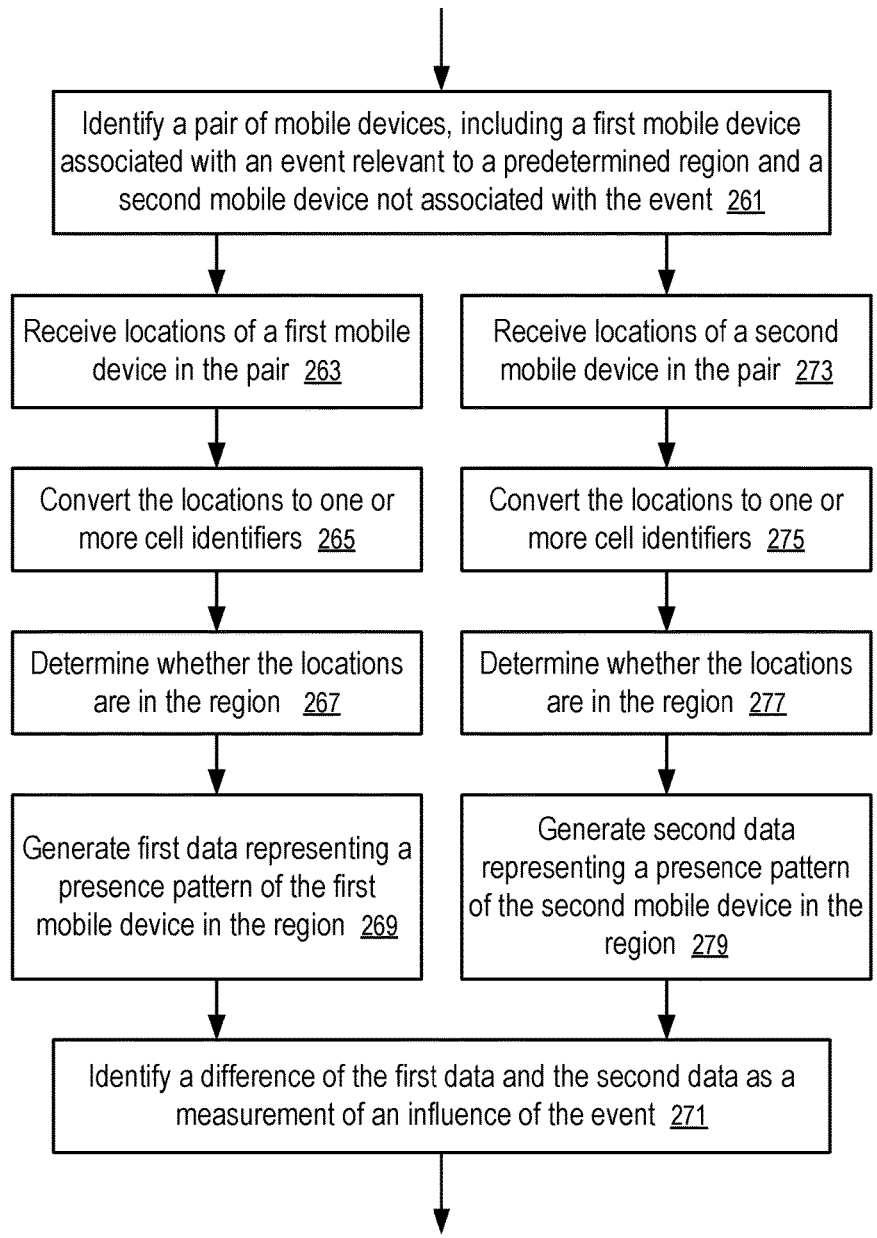
FIG. 18 shows a method to detect differences in location patterns of different mobile devices visiting a predetermined region according to one embodiment.

For example, the event may include an advertisement for a geographical region; and the method may be adapted to measure the effectiveness of the advertisement in changing a pattern of visitation to the geographical region, as illustrated in FIG. 18.

FIG. 18 shows a method to detect differences in location patterns of different mobile devices visiting a predetermined region according to one embodiment.

In FIG. 18, the server (187) identifies (261) a pair of mobile devices, including a first mobile device associated with an event relevant to a predetermined region and a second mobile device not associated with the event, to measure an influence of an event related to the region.

For the first mobile device, the server (187) is configured to: receive (263) locations of the first mobile device; convert (265) the locations to one or more cell identifiers; determine (267) whether the locations are in the region using the techniques discussed above based on searching for matching cell identifiers; and generate (269) first data representing a presence pattern of the first mobile device in the region.

For the second mobile device, the server (187) is similarly configured to: receive (273) locations of the second mobile device; convert (275) the locations to one or more cell identifiers; determine (277) whether the locations are in the region using the techniques discussed above based on searching for matching cell identifiers; and generate (279) second data representing a presence pattern of the second mobile device in the region.

The server (187) identifies (271) a difference of the first data and the second data as a measurement of an influence of the event. Preferably, the pair of mobile devices have similar attributes and/or location patterns prior to the event. Alternatively, the change in location patterns of the first mobile device before and after the event can be compared to the change in location patterns of the second mobile device before and after the event to measure the influence of the event.

In one embodiment, the measured influence is based on the difference between two groups of mobile devices, instead of the different between two mobile devices, to account for the pattern variations in the individual mobile devices.

Figure 19:
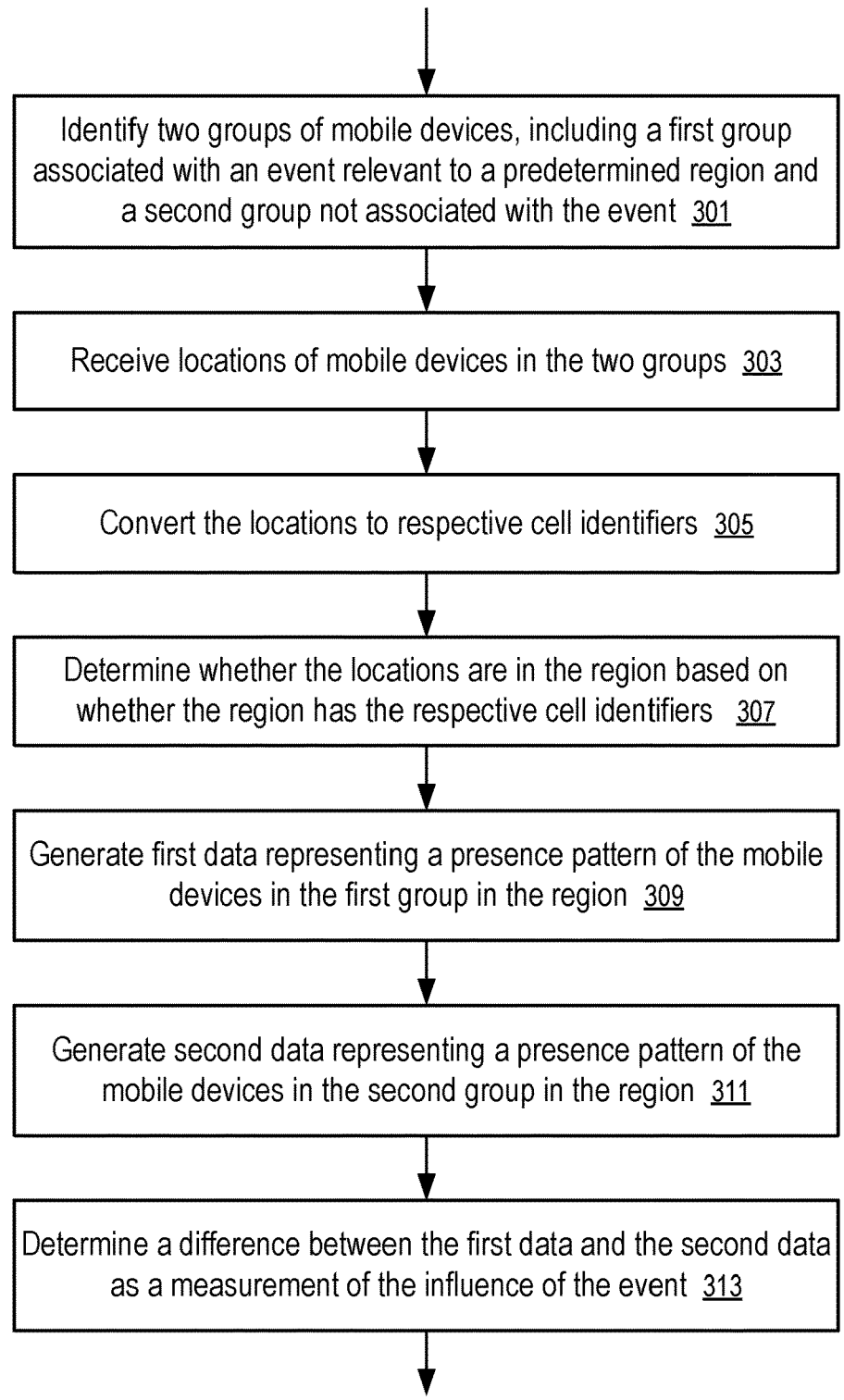
FIG. 19 shows a method to measure the influence of an event based on differences in location patterns of mobile devices visiting a predetermined region according to one embodiment.

FIG. 19 shows a method to measure the influence of an event based on differences in location patterns of mobile devices visiting a predetermined region according to one embodiment.

In FIG. 19, the server (187) is identifies (301) two groups of mobile devices, including a first group associated with an event relevant to a predetermined region and a second group not associated with the event, to measure the influence of the event on groups of mobile devices.

The server (187) is configured to: receive (303) locations of mobile devices in the two groups; convert (305) the locations to respective cell identifiers; determine (307) whether the locations are in the region based on whether the region has the respective cell identifiers; generate (309) first data representing a presence pattern of the mobile devices in the first group in the region; and generate (311) second data representing a presence pattern of the mobile devices in the second group in the region.

The server (187) determines (313) a difference between the first data and the second data as a measurement of the influence of the event.

In one embodiment, the server (187) determines the change of presence pattern of each mobile device, the average change of presence pattern in the first group, the average change of presence pattern in the second group, and then the difference between the average changes of presence pattern in the two groups for a measurement of the influence of the event.

In some embodiments, the presence patterns of mobile devices are determined to select groups of mobile devices having similar behaviors, including the presence patterns.

Figure 20:
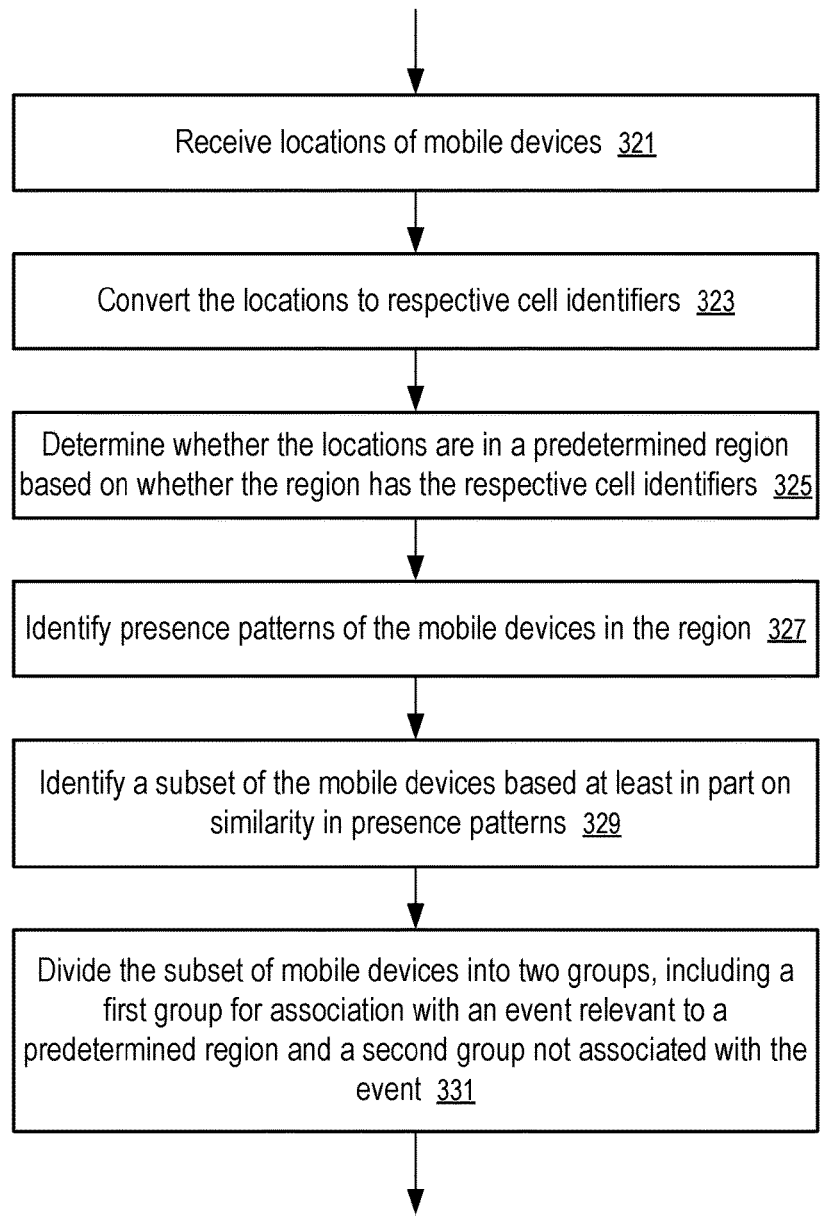
FIG. 20 shows a method to identify mobile devices having similar patterns of visiting a predetermined region according to one embodiment.

FIG. 20 shows a method to identify mobile devices having similar patterns of visiting a predetermined region according to one embodiment. The mobile devices having similar behaviors can be divided into two groups to measure the influence of an event.

In FIG. 20, the server (187) is configured to: receive (321) locations of mobile devices; convert (323) the locations to respective cell identifiers; determine (325) whether the locations are in a predetermined region based on whether the region has the respective cell identifiers; identify (327) presence patterns of the mobile devices in the region; and identify (329) a subset of the mobile devices based at least in part on similarity in presence patterns.

The server (187) divides (331) the subset of mobile devices into two groups, including a first group for association with an event relevant to a predetermined region and a second group not associated with the event. The method of FIG. 20 can then be used to measure the influence of the event.

In some embodiments, an event may have influence on the visitation patterns of a mobile device in visiting multiple regions.

Figure 21:
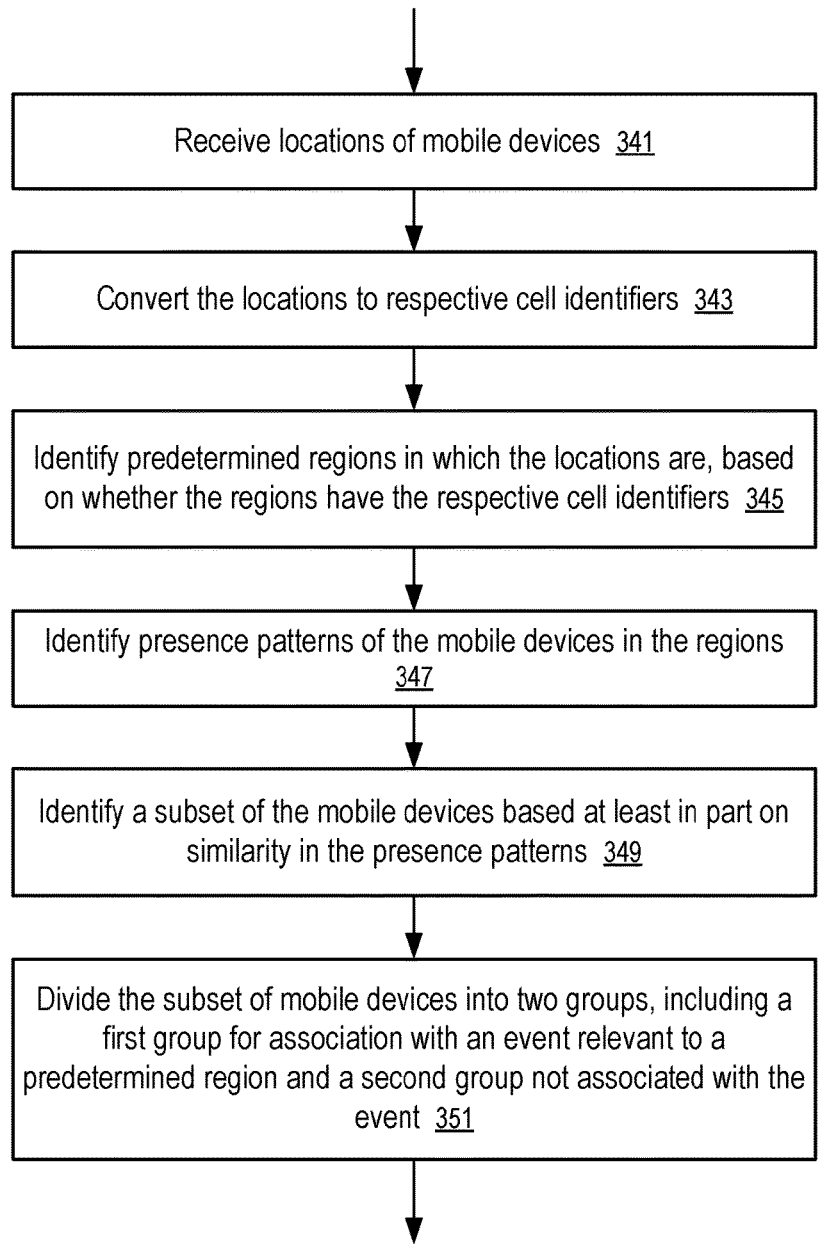
FIG. 21 shows a method to identify mobile devices having similar patterns of visiting predetermined regions according to one embodiment.

FIG. 21 shows a method to identify mobile devices having similar patterns of visiting predetermined regions according to one embodiment.

In FIG. 21, the server (187) is configured to: receive (341) locations of mobile devices; convert (343) the locations to respective cell identifiers; identify (345) predetermined regions in which the locations are, based on whether the regions have the respective cell identifiers; identify (347) presence patterns of the mobile devices in the regions; identify (349) a subset of the mobile devices based at least in part on similarity in the presence patterns; and divide (351) the subset of mobile devices into two groups, including a first group for association with an event relevant to a predetermined region and a second group not associated with the event.

In one embodiment, the locations of a mobile device are received as a function of time. Thus, the visitations of the mobile devices are determined as a function of time to determine presence patterns based at least in part on time.

Figure 22:
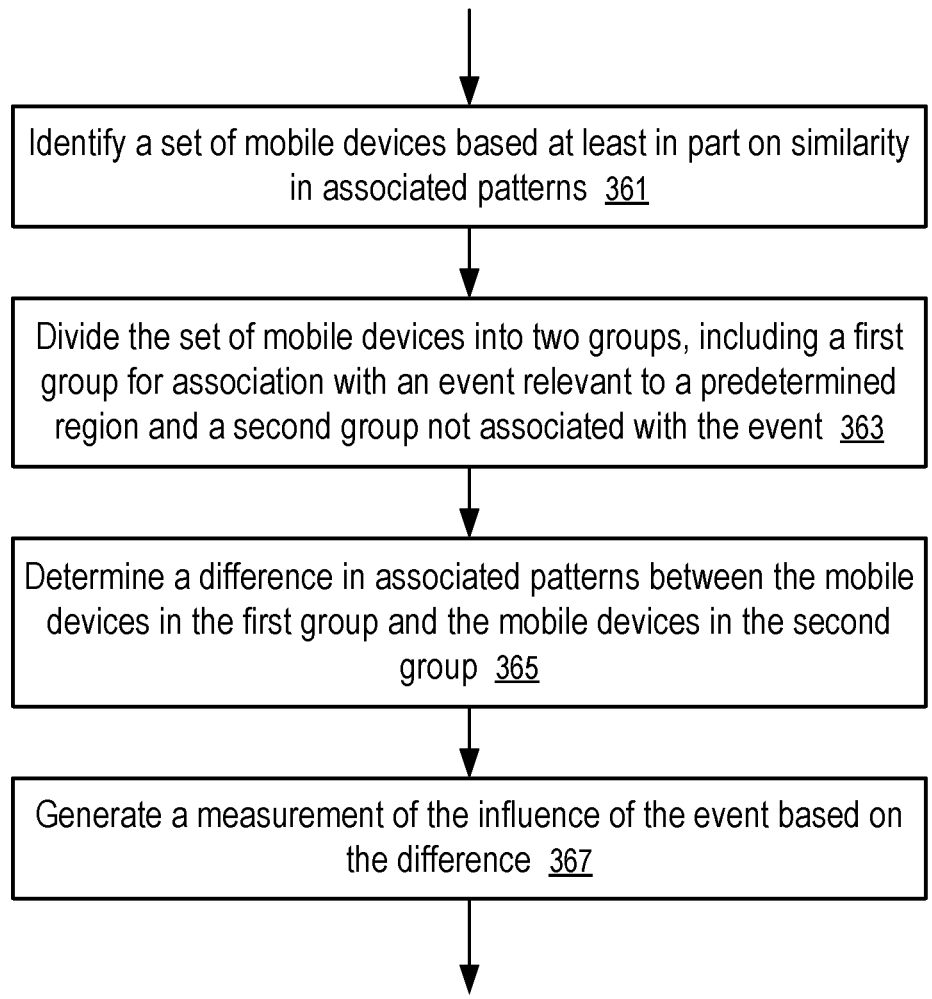
FIG. 22 shows a method to measure the influence of an event according to one embodiment.

FIG. 22 shows a method to measure the influence of an event according to one embodiment.

In FIG. 22, the server (187) is configured to: identify (361) a set of mobile devices based at least in part on similarity in associated patterns; divide (363) the set of mobile devices into two groups, including a first group for association with an event relevant to a predetermined region and a second group not associated with the event; determine (365) a difference in associated patterns between the mobile devices in the first group and the mobile devices in the second group; and generate (367) a measurement of the influence of the event based on the difference.

In one embodiment, when the set of mobile devices initially having similar but not identical associated patterns prior to the event, the server (187) is configured determine the change of associated patterns for each mobile device before and after the event. The server (187) then determines the difference in the changes of associated patterns in the first and second groups to measure the influence of the event.

For example, the above discussed techniques can be used to measure the advertising effectiveness. In various embodiments, attribute data included in a first user profile may be used to select a second user profile that is substantially similar to the first user profile. The first user profile may include an indication of exposure to advertising content data associated with a location and the second profile may not include such an indication. For example, a first user profile may be associated with a first user that has seen an advertisement for a location and the second user profile may be associated with a second user who has not seen the ad. In various embodiments, propensity score matching and/or other approaches may be used to select a second user profile. For example, a propensity score may be generated based on the attribute data in the first user profile (e.g. demographic data, behavioral data, etc.) and the propensity score may be compared to propensity scores generated for other user profiles to select a second user profile. The second user profile may, for example, be associated with a propensity score that matches (e.g., most closely matches) the propensity score associated with the first user profile.

According to some embodiments, first behavior information (e.g., a change in number/frequency of visits to a location over a period prior to and over a period after seeing an ad related to the location) may be determined based at least in part on an association between the first user profile and a location associated with the advertising content data. Second behavior information may be determined based at least in part on an association between the second user profile and the location. An advertising effectiveness value may be generated based at least in part on the first behavior information and the second behavior information.

In one embodiment, attribute data included in a first user profile may be used to select a second user profile that is substantially similar to the first user profile. In various embodiments, attribute data may include, for example, demographic data, behavioral data, data from third-party sources, psycho-graphic data, location visit frequency patterns, shopping cart spend data (e.g., including similar products and/or categories of products), and/or any other data associated with a user. A first user profile may include a user profile for a user that has been exposed to advertising content associated with a location (e.g., an advertisement to drive foot traffic to the location). In some embodiments, attribute data included in a first user profile may be compared to attribute data associated with one or more other user profiles associated with users who have not been exposed to the advertising content. And a user profile including attributes that are substantially similar to (e.g., matches) the attributes included in the first user profile may be selected. Various approaches may be used to identify (e.g., select) matching user profiles including, for example, propensity score matching, statistical matching approaches, one-to-one matching, and/or any other any other matching technique.

In various embodiments, the first user profile may include a user profile from an exposed/test group, and the second user profile may include a user profile from a control group and/or general population group. The first user profile and second user profile may be used to test (e.g., measure) the effectiveness and/or influence of advertising content data associated with a location (e.g., an advertisement to drive users to a retail location). The first user profile (e.g., the exposed/test group user profile) may include an indication that a user associated with the first user profile has been exposed to advertising content data associated with a location. And the second user profile (e.g., control group user profile, general population user profile) may include an indication that a user associated with the second user profile has not been exposed to the advertising content. In various embodiments, to accurately measure the influence of the advertising content data, the second user profile may be selected such that any attributes, characteristics, biases, confounding variables, and/or other factors that may affect the outcome of the measurement are reduced and/or eliminated. In certain cases, any variables potentially affecting the outcome of the measurement may be reduced by selecting a second user profile that is substantially similar (e.g., as close as possible) to the first user profile.

By way of example, a first user profile may include attribute data including demographic data (e.g., data indicating that the user is female, 30-40 years old, resides in San Francisco, Calif., has a household income of $100,000, etc.), behavioral data (e.g., the user visits a coffee shop three times per week), third party data (e.g., purchased a condo for $200,000 in 2006), psycho-graphic data (e.g., leads a healthy lifestyle, likely to vote for a particular political party, etc.), and other attribute data. Based on the attribute data, a second user profile that matches (e.g., is substantially similar to) the first user profile may be selected. The second user profile may include similar (e.g., matching) attribute data including demographic data (e.g., user is female, 30-40 years old, residing in San Francisco, Calif., household income of $95,000, etc.), behavioral data (e.g., visits the coffee shop four times per week), and/or other attribute data.

In one example matching approach, the attribute data from user profiles may be used in a regression approach (e.g., logistic regression, linear regression, etc.) to generate a model (e.g., generalized linear model (GLM), logit model, discrete choice model, etc.). For example, a model (e.g., generalized linear model (GLM)) may represent a correlation between a dependent variable of whether or not a user has been exposed to advertising content and a set/vector of covariates including attribute data included in the user profiles. The model (e.g., generalized linear model (GLM)) may be used to generate propensity scores for each of the multiple profiles. In some embodiments, a propensity score associated with the first user profile (e.g., associated with a user who has seen an ad) may be used to identify/select a matching (e.g., most closely matching) second user profile (e.g., associated with a user who has not seen the ad). A variety of matching approaches including nearest neighbor, kernel, local linear, caliper, and/or other matching techniques may be used to match the first and second user profiles based, for example, on propensity scores.

In one embodiment, first behavior information may be determined based at least in part on an association between the first user profile and a location associated with advertising content data. In various embodiments, behavior information may include information associated with a user's presence at one or more locations. In some embodiments, a first behavior information may include a number of instances, a number of instances over a period of time, and/or a frequency/rate that a user associated with the first user profile has been determined to be present at the location (e.g., visited the location). For example, a user may be determined to be present at a location based on location data (e.g., latitude/longitude and/or other location identifying information) received from a mobile device associated with the user. In certain cases, the location data may be received in connection with an advertisement request, a WiFi login page, marketing opportunity within a mobile application, entering a geo-fence, a deal and/or opportunity associated with a mobile device, etc. In various embodiments, location data received from a user device may be mapped to one or more defined locations. And based on a mapping of location data to a location associated with advertising content data, a user may be determined to be present at that location. When a user is determined to be present at a location, a user profile associated with that user may be updated to include information (e.g., behavioral information) associated with the user's presence at the location. For example, the user profile may be updated to include the location, a time (e.g., time/day stamp) of presence, duration of presence (e.g., five minutes), and/or other information related to the user's presence at the location. This information may be used to determine behavior information associated with the user profile and the location.

According to various embodiments, behavior information may include a number of times that and/or frequency with which a user associated with a user profile has been present at a location prior to and/or after being exposed to a digital advertisement. For example, a user associated with a first user profile may receive a digital advertisement including advertising content data associated with a location at certain time (e.g., a time (t0), a date, etc.). The time at which a user is exposed to advertising content data may include an advertising exposure time (e.g., time of exposure). In various embodiments, a user may have been exposed to advertising content data multiple times and the advertising exposure time may include the time of first exposure, time of last exposure, an average/median time over a period of multiple exposures, and/or any other time.

In some embodiments, behavior information associated with a first user profile may include a number of times a first user visited the location over a period of time (e.g., one week, three days, etc.) prior to exposure to advertising content data (e.g., viewing an ad). The period prior to exposure may include, for example, a look-back period. The look-back period may include any period of time (e.g., a predefined period, arbitrary period, etc.). A number, frequency, and/or rate at which a user visits a location during the look-back period may include a natural visit frequency/rate. A natural visit rate may represent a rate at which a user visits a location in the absence of exposure to advertising content (e.g., of the user's own volition, uninfluenced by advertising content, etc.).

In various embodiments, behavior information associated with the first user profile may include a number of times the user visited the location over a period of time after the time of exposure to the advertising content data (e.g., viewing the ad). The period of time after advertising exposure may include a look-forward period, and the look-forward period may be selected/determined in a manner similar to the look-back period. In certain cases, the look-forward period, however, may be selected to be substantially different than the look-back period. In another example, behavior information may include a frequency (e.g., one time per day, three times per week, etc.) at which the user visited the location during the look-forward period after exposure to the advertising content.

In some embodiments, behavior information may include a difference between a natural visit rate (e.g., a number of times and/or frequency at which a user was at the location during a period of time (e.g., a look-back period) prior to exposure to the advertising content data) and a number of times and/or frequency at which the user was at the location during a period of time after exposure (e.g., a look-forward period). The first behavior information may, for example, include value(s) quantifying an increase, decrease, and/or lack of change of the first user's behavior relative to the location (e.g., presence at the location) prior to and after seeing an advertisement. In various embodiments, an increase in presence at a location after viewing advertising content may indicate that the advertising content was successful in influencing the behavior of the user.

In various embodiments, behavior information may be determined based on location data from multiple mobile devices. For example, a user may be present at a location on a first day as determined by location information from a first device. After the first day, the user may replace the first device with a second device. Subsequently the user may be determined to be present at the location based on location data from the second device. In this case, location information received from both devices may be included in a user profile for the user, and behavior information may be determined based on location data from both devices that is included in the user profile.

In one embodiment, second behavior information may be determined based at least in part on an association between the second user profile and the location. In various embodiments, the second behavior information may include a number of instances, a number of instances over a period of time, and/or a frequency that a user associated with the second user profile (e.g., a control group profile) has been determined to be present at the location (e.g., visited the location).

In various embodiments, the second behavior information may include a change, if any, between the second user's visit frequency over a period (e.g., a look-back period) prior to a point in time as compared with the second user's visit frequency over a period (e.g., a look-forward period) after the point in time. The point in time (e.g., a reference time) may include, for example, the time at which the first user was exposed to the advertising content, a time relative to the time at which the first user was exposed to the advertising content, an arbitrary time, a time selected to ensure a proper comparison with the first behavior information, and/or another time.

In one embodiment, an advertising effectiveness value (e.g., a value representing advertising effectiveness, advertising effectiveness indicator) may be generated based at least in part on the first behavior information and the second behavior information. In some embodiments, an advertising effectiveness value may include number(s), value(s), percentage(s), metric(s) (e.g., a return on investment (ROI) metric, key performance indicator (KPI)), and/or any other data. The advertising effectiveness value may represent a change in number of visits (e.g., increase/lift in foot traffic) to a location as a result of exposure to the advertising content data.

In various embodiments, an advertising effectiveness value may be calculated/generated based on the first and second behavior information. In some embodiments, the advertising effectiveness value may be generated based on a comparison between a change in behavior from a time (e.g., a first time, a series of times, etc.) a first user sees an ad relative to their natural visit rate and a change in behavior of a second user who did not see the ad at the same time (e.g., an absolute same time, relative same time, etc.). Stated another way, the advertising effectiveness value may be generated based on a comparison of the first behavior information associated with a first user who saw an ad related to a location and second behavior information associated with a second user who did not see the ad. As discussed above, the first behavior information may include a change in a first user's visit behavior after exposure to advertising content relative to their natural visit rate. In other words, the first behavior information may be calculated based on a comparison (e.g., difference, change, etc.) of a first user's visit frequency to a location over a period of time (e.g., a look-back period) prior to exposure to advertising content related to the location and the user's visit frequency over a period after exposure (e.g., a look-forward period) to the advertising content. A second behavior information may include a change in behavior of a second user, who was not exposed to advertising content, as measured by a comparison of the second user's visit frequency to the location over a period (e.g., look-back period) prior to a certain time (e.g., the time when the first user saw the ad, a time relative to the time the first user saw the ad, an arbitrary time, etc.) and the second user's visit frequency over a period (e.g., look-forward period) after that time. The comparison of the first behavior information and second behavior information may be used to generate an incremental lift (e.g., advertising effectiveness value, which can be positive, negative, and/or zero) associated with the advertising content.

By way of example, first behavior information may indicate that a first user visited a coffee shop four times in the two weeks (e.g., a look-back period) prior to exposure to an ad for the coffee shop (e.g., an ad for a free coffee at the shop displayed to the first user on their mobile device). This visit rate over the look-back period (four times in two weeks (i.e., two times per week)) may include a natural visit rate for the first user. The first behavior information may also indicate that the first user visited the coffee shop four times in the week following exposure to the advertisement (e.g., a look-forward period). A second user profile may be matched to the first user profile using the matching techniques discussed herein. The second user may be a user with similar attributes to the first user. Second behavior information may indicate that the second user visited the coffee shop three times over the two weeks (e.g., a look-back period) prior to a point in time (e.g., the time the first user was exposed to the ad, a reference time, etc.) and two times in the week after that point in time. The advertising effectiveness value may be calculated based on the first behavior information and second behavior information. In one example, the advertising effectiveness value may include a comparison between a change in the first user's visit frequency prior to and after ad exposure time (e.g., four visits per week during the look-forward period versus two visits per week during the look-back period or a change/increase of two visits per week) and a change in the second user's visit frequency prior to and after the point in time (e.g., two times per week during the look-forward period and 1.5 times per week during the look-back period or a change of 0.5 visits per week).

In various embodiments, the process of generating advertising effectiveness values may be repeated for multiple pairs of users (e.g., associated with a location). And the multiple advertising effectiveness values may be aggregated (e.g., summed up, added together) to generate an aggregate advertising effectiveness value as discussed in detail below. An aggregate advertising effectiveness value including one or more advertising effectiveness values may include a location conversion index (LCI). In various embodiments, a group of users may be selected to determine an effectiveness/influence of advertising content (e.g., in driving users to a retail location). The group of users may, for example, be related to the location in some way (e.g., each user may have visited the location over a period of time, the users may have similar demographic attributes, etc.). The group of users may be divided into subgroups including an exposed subgroup (e.g., test subgroup) of users that have been exposed to the advertising content data and control subgroup including users not exposed to the advertising content data. Using the techniques discussed herein user profiles from the exposed subgroup may be paired to user profiles from the control subgroup and/or a general population subgroup. And advertising effectiveness values may be generated for each pairing of users, and the advertising effectiveness values may be aggregated (e.g., summed up) to generate an aggregate advertising effectiveness value. In various embodiments, the process of generating advertising effectiveness values may be performed iteratively across many different user profiles.

In some embodiments, the process of generating advertising effectiveness values may be repeated for multiple types of advertising content. For example, advertising effectiveness values may be generated for multiple versions of advertising content data.

In various embodiments, a user profile may include, for example, demographic data (e.g., household income, residence, value of home(s), occupation, work location, age, gender), behavioral data, data from third party data sources (e.g., property records, social network profile information, etc.), mobile device data (e.g., a list of applications on a device), psycho-graphic data, location visit frequency patterns, shopping cart spend data (e.g., including similar products and/or categories of products), and/or any other data associated with a user.

In some embodiments, behavioral attributes may be derived, for example, from a user's past locations (e.g., location pattern(s)), prior actions, and/or other data. For example, a user (e.g., associated with user profile) may have been determined to be at a location based on a location data received, for example, along with a mobile advertising request (e.g., from the user's mobile device). The location data may be mapped to a business, place of interest, zip+4 code, and/or other location. The mapped location data may be used to update a location pattern in the user's profile. The location patterns, behavior attributes, and/or other location-related information may be included in a location graph in, for example, the user's profile.

In some embodiments, demographic, behavioral, and/or other attributes associated with the business, place of interest, etc. to which a user's location has been mapped may be included in a user profile associated with that user. For example, a business (e.g., location) may be associated with demographic, behavioral, and/or other attributes. And as a result of a user's detected presence at the business, behavioral and/or other attributes associated with the business may be attributed to the user (e.g., added to a user profile associated with the user). In certain cases, attributes added to a user profile may be confirmed to be correct or incorrect based on other information (e.g., attributes associated with other locations the same user has visited, information from third party data sources, a user's device, etc.).

In some embodiments, an advertising effectiveness platform/service residing on one or more servers generates advertising effectiveness values (e.g., advertising effective index(es), location conversion index(es)/values, etc.) based on information derived from one or more user profiles. The advertising effectiveness service may query, mine and/or otherwise process user profile information stored in the user profile data store. For example, user profile information may be selected from the user profile data store and behavior information may be determined based on the selected user profile information. Advertising effectiveness values (e.g., generated based on the behavior information) may be stored in an advertising effectiveness data store. In various embodiments, an advertising provider may use the advertising effectiveness service to measure the effectiveness (e.g., influence, value, ROI, etc.) of an advertising campaign.

In one embodiment, an advertiser, advertisement provider, advertisement platform, and/or other entity may seek to determine an effectiveness of an advertising campaign associated with a retail location (e.g., an advertisement associated with a retail location). A first user may be selected based on a determination that the first user has been served advertising content associated with the campaign, the first user has visited the location prior to being served advertising content, and/or other criteria. In various embodiments, attribute data associated with a first user (e.g., included in a first user profile) may be used to select a second user. For example, location attribute data associated with the first user may indicate that the first user is a female, age 20-30, and employed at a technology firm. The location attribute data may also indicate that the first user visited the retail location (e.g., a fashion retailer) four times in the month prior to viewing an advertisement for the retail location. This natural visit frequency prior to being served the advertising content may include normal visits, unaided visits, and/or other types of visits to the retail location. Based on the first user's attribute data, a second user may be selected. In various embodiments, the second user may be selected using attribute-based matching, propensity score matching, and/or other matching approaches. The second user may, for example, include a user most similar (e.g., in demographic, behavioral, and/or other attributes; propensity score; and/or other metrics) to the first user. The second user may be selected based on a determination that the second user has not been exposed to the advertising content associated with the retail location and/or any advertising content associated with the retail location. In this example, a second user who is a female, age 20-30, employed at a law firm and visits the retail location three times per month may be selected. Whereas, another user who is a male, aged 40-50, employed as a doctor, and visits the retail location two times per quarter may not be selected as a similar user. The user may, however, be selected as a randomly-selected user as discussed below.

In various embodiments, first behavior information may be determined. In certain cases, the first behavior information may represent a comparison of a number of visits prior to and after the first user has been exposed to the advertising content (e.g., has viewed an ad, is presumed to have viewed an) associated with the retail location. According to some embodiments, second behavior information may be determined. In certain cases, the second behavior information may represent a number of times the second user visits the retail location prior to and after a certain point in time (e.g., the time the first user was exposed to the advertising content, another time, etc.). In various embodiments, an advertising effectiveness value may be generated based on the first behavior information associated with the first user and the second behavior information associated with second user. In various embodiments, the advertising effectiveness value may quantify/represent the influence of the advertising content data associated with the location.

According to some embodiments, an advertising effectiveness value may be generated based on a comparison of behavior information associated with the first user and behavior information associated with a randomly-selected user (e.g., a user from the general population). In various embodiments, a randomly-selected user may be selected based on a determination that the user is associated with the location (e.g., has visited the location over a period of time). It may be determined, for example, that the user has visited (360) the retail location; however, demographic data associated with user may not be similar to the demographic data associated with the first user. In various embodiments, an advertising effectiveness value may be generated based the behavior information associated with the first user and behavior information associated with the randomly-selected user using the approaches discussed herein. Generating an advertising effectiveness value based on a comparison of the behavior information associated with the first user and a randomly-selected user may provide additional insight into the effectiveness/influence of an advertisement.

In one embodiment, it may be determined that a user profile includes an indication of exposure to advertising content data and/or engagement to/with advertising content data. For example, an indication of exposure to advertising content data may include a record indicating that a digital advertisement including advertising content data associated with a location has been presented to a user. The indication may be generated, for example, when a digital advertisement is output to a user on a device (e.g., a mobile device, computer, smart television, wearable computer, etc.). An indication of engagement to/with advertising content data may include a record indicating that a user has engaged with advertising content by, for example, clicking on an ad, expanding an ad, engaging with an via voice input, and/or other records. In various embodiments, an indication of exposure/engagement may be associated with user profile and not a specific device. For example, a device (e.g., a home computer) on which the user was presented advertising content data and/or interacted with advertising content may be different than a device detected to be at a location of interest. In some embodiments, an indication of exposure/engagement may be generated when it is determined that a user has viewed and/or is likely to have viewed an advertisement presented in a non-digital medium (e.g., a print ad, mailed advertisement, etc.).

In one embodiment, the user profile may be selected based on the determination that the user associated with the profile has been exposed/engaged (e.g., is presumed to have viewed) to and/or engaged with the advertising content data. In various embodiments, a first user profile (e.g., test user profile) may be selected as a test user profile (e.g., for comparison with a control user profile as discussed herein) based on the determination that the first user profile includes an indication of exposure/engagement to the advertising content data.

In one embodiment, a continuity factor associated with a user profile may be determined. In various embodiments, continuity factors associated with user profiles may be used to select statistically significant user profiles. A continuity factor may indicate whether and/or to what extent a user was an active user (e.g., active in the system) prior to the time at which advertising content is served and/or after the advertising content has been served. A continuity factor, in some embodiments, may include a heart-beat indicator associated with the user. For example, if a user is determined to have been an active user on three separate days in the week prior to being served an advertisement for a location and three separate days after viewing the advertisement, the continuity factor for that user may be determined to be three. In various embodiments, the period of time prior to ad exposure and after ad exposure may be selected based on various factors associated with the advertising effectiveness calculation. The periods of time may, for example, be provided via user interface and/or other console from an advertiser.

In various embodiments, a continuity factor for a user profile may be generated based on location data from multiple mobile devices. For example, a user may be present at a location on a first day as determined by location information from a first device. After the first day the user may replace the first device with a second device. Subsequently the user may be determined to be present at the location based on location data from the second device. In this case, location information received from both devices may be included in a user profile for the user, and a continuity factor may be generated from the location data from both devices.

In one embodiment, it may be determined whether a continuity factor is above a threshold. In various embodiments, a threshold continuity factor may be set to, for example, one or any other value. A continuity factor greater than or equal to a threshold (e.g., one) may indicate that a user has been an active user before and after being served advertising content. This may indicate that the user profile is viable to be used in the propensity score calculation. In some embodiments, a continuity factor below a threshold (e.g., one) may indicate that the user was not present in the system prior to being served the advertisement. A user profile associated with a continuity factor below a threshold (e.g., one) may not be viable to be used in the propensity score calculation for purposes of evaluating the influence/effectiveness of advertising content data. In this case, the user may not be selected and the process may end.

In one embodiment, a user profile associated with a continuity factor above a threshold may be selected. In various embodiments, a user profile associated with a continuity factor value above a threshold may be selected as a test user profile (e.g., first user profile).

In one embodiment, propensity scores may be generated based on attribute data included in one or more user profiles. In some embodiments, a propensity score may represent a conditional probability of assignment to a particular treatment (e.g., exposure to the advertising content) given a set (e.g., vector) of observed covariates (e.g., attribute data including, for example, demographic attributes, behavioral attributes, psycho-graphic data, etc.). For example, a propensity score may represent a conditional probability of exposure to advertising content given a vector of attribute data (e.g., demographic data, behavioral data, psycho-graphic data, location visit frequency patterns, shopping cart spend data (e.g., including similar products and/or categories of products)).

In various embodiments, a propensity score associated with a user profile may be calculated by regressing the variable of whether or not the user has been exposed to advertising content against the attribute data included in the user profile. Using regression and/or other statistical approaches a model (e.g., generalized linear model (GLM), discreet choice model, etc.) may be generated representing a correlation between a dependent variable of whether or not a user has been exposed to advertising content and a set/vector of covariates including attribute data in the user profiles. In various embodiments, attribute data may be selected for inclusion in the set/vector of covariates to adjust for natural visit patterns, seasonal visit patterns, events, and/or other factors associated with the location of interest. The model (e.g., generalized linear model (GLM)) may be used to generate propensity scores for each of the multiple profiles. In some embodiments, the propensity score calculation process may account/compensate for natural visit patterns, seasonal visit patterns, events, and/or other factors associated with the location by virtue of the attribute data included in the propensity score calculation. For example, matching user profiles based on propensity score may reduce bias resulting natural visit patterns, seasonal visit patterns, events, and/or other factors.

In one embodiment, a first propensity score associated with the first user profile (e.g., a user profile in an exposed group) may be compared to one or more propensity scores each associated with a user profile in a control group (e.g., a group of user profiles for users not exposed to the ad content). In various embodiments, a first propensity score associated with the first user profile (e.g., a test group user profile) may be compared to one or more propensity scores to determine matching (e.g., closest/best matching) propensity scores.

In one embodiment, it may be determined whether a first propensity score matches one or more propensity scores. In some embodiments, a first propensity score may be compared to one or more propensity scores to determine a most-closely matching propensity score. In certain embodiments, nearest neighbor, kernel, local linear, caliper, and/or other matching techniques may be used to match the first propensity score to one or more propensity scores. In various embodiments, the first propensity score may be iteratively compared to multiple propensity scores to identify a most-closely matching propensity score. For example, a first propensity score (e.g., associated with a first user profile) may include a scalar value of 0.7, and this score may be compared to multiple propensity scores (e.g., 0.72, 0.65, 0.6, etc.) each associated with a user profile. Based on this example comparison, the propensity score of 0.72 may be selected as a most closely matching propensity score. In the event no propensity score is determined to match the first propensity score, the process may end.

In some embodiments, propensity scores may be matched based on a threshold and/or limit. For example, a first propensity score may match a second propensity score if the difference between the two propensity scores is within a threshold. For example, a first propensity score associated with a first user profile may include a scalar value of 0.35 and a second propensity score may include a scalar value of 0.3 and a threshold difference may be defined as 0.1. Because this difference between the first propensity score (e.g., 0.35) and second propensity score (e.g., 0.3) is less than the threshold (e.g., 0.1), the second propensity score may be determined to match (e.g., potentially match) the first propensity score.

In one embodiment, user profiles may be selected based on the matching propensity scores. In various embodiments, based on the propensity score matching process, the first user profile (e.g., including an indication of exposure to the advertising content) may be matched to a second user profile, and this pair of profiles may selected. Once selected, an advertising effectiveness value may be calculated for the pair of user profiles.

In an embodiment of a process of calculating behavior information, a first timeline depicts a first user's behavioral patterns relative to a location (e.g., a retail location, restaurant, etc.) over a period of time. Each observation of the user (e.g., point) on the timeline may represent a point in time at which the first user was observed at the location. As depicted in the first timeline, the first user may, for example, have been served advertising content (e.g., associated with the location) at an ad exposure time (e.g., time of ad exposure, t0, etc.). In some embodiments, a look-back period may include a period prior to the ad exposure time. A look-forward period may include a period after the ad exposure time. In some embodiments, the look-forward period and look-back period may include equal or different lengths/durations of time.

In some embodiments, first behavior information (e.g., associated with a user profile) may include a comparison of a first user's natural visit rate and post-advertising exposure visit rate (e.g., after exposure to the advertising content) to the location. A natural visit rate may include a number/frequency of user visits to the location over the look-back period. A post-exposure visit rate may include a number/frequency of visits to the location over the look-forward period after exposure to the advertising content. The first behavior information may include a difference (if any) between the first user's post-exposure visit rate and the natural visit rate.

In various embodiments, a second timeline is shown depicting a second user's behavioral patterns relative to a same location over a period of time. The second user in this case may not have been exposed to advertising content related to the location. In some embodiments, a look-back period for the second user may include a period prior to a point in time (e.g., a reference time). A look-forward period may include a period after the point in time. In various embodiments, the point in time (e.g., reference time) may be equivalent to the advertising exposure time (e.g., the same absolute time) at which the first user was exposed to the advertising content, another time determined based on the first and/or second user profile attributes, an arbitrary time, and/or any other time.

In some embodiments, the look-back period associated with the second user may be related to the look-back period associated with the first user. In one example, the two periods may span equivalent period(s) of time, though not necessarily the exact same period(s). For example, the first look-back period may include a first week (e.g., the last Wednesday in December to the first Wednesday in January, etc.), and the second look-back period may include (e.g., the first Saturday in February to the second Saturday in February). In another example, the first look-back period and second look-back period may span periods of time of varying duration. In various embodiments, similar relations may be exist between the first look-forward period and second look-forward period.

In various embodiments, the look-back period, look-back period, look-forward period, look-forward period may be determined/selected based on input from a user of the advertising effectiveness platform, attributes associated with the first/second user profiles, and/or other parameters. In some embodiments, the look-back periods, and/or look-forward periods, may be selected to account/adjust for natural visit patterns, seasonal visit patterns, events (e.g., weather events, a sale at the location, etc.) associated with the location, and/or other factors that may influence/affect/skew the calculation of the advertising effectiveness value.

By way of example with reference to the first user timeline, a first user may be observed (e.g., via a mobile device) at a restaurant three times during the look-back period (e.g., as indicated by the three points on the timeline during the look-back period). The look-back period may include a one-week period prior to an ad exposure time of Jan. 1, 2014. The first user may have been shown advertising content related to the restaurant at the advertising exposure time (e.g., Jan. 1, 2014). And during the look-forward period including the two-week period after Jan. 1, 2014, the first user may be observed at the restaurant eight times. In this case, the first behavior information may include a difference between the first user's frequency of visits to the location during the look-back period—three times per week—and the first user's visit frequency during the look-forward period—four times per week. The first behavior information may include, for example, an increase of one visit per week, a 33.3% increase in visits per week, etc.

As depicted, for example, in the second user timeline, a second user may be observed at the restaurant (e.g., the same restaurant) four times during a second look-back period—the one-week period prior to Feb. 1, 2014. The second user may also be observed at the restaurant five times during a second look-forward period—the two weeks after Feb. 1, 2014. In this case, the second behavior information may include a difference between the second user's visit frequency to the location during the first look-back period—four visits per week—and the second user's visit frequency to the location during the second look-forward period—six visits over two weeks. The second behavior information may include, for example, a decrease of one visit of per week, a 25% decrease in visits per week, etc. In this case, the change in visit behavior after the reference time is negative (e.g., indicating a decrease). In certain cases, this negative value may be assumed to be the result from random behavioral patterns of the second user, and may be changed to zero indicating no change in behavior.

According to some embodiments, an advertising effectiveness value may be calculated based on the first behavior information and second behavior information. In this case the advertising effectiveness value may include a comparison between the first behavior information—an increase in one visit per week by the first user—and the second behavior information—a decrease of one visit per week by the second user. In this case, the advertising effectiveness value may include and incremental difference (e.g., incremental lift) of two visits per week. This value may indicate that exposure/interaction with the advertising content resulted in an increase visit frequency of two visits per week.

In one embodiment, two or more advertising effectiveness values may be generated. In various embodiments, a group of users including similar attributes may be selected to determine an effectiveness/influence of advertising content (e.g., in driving users to a retail location). For example, an advertiser associated with a quick service restaurant (QSR) chain may seek to quantify the value of an adverting campaign in driving foot traffic a QSR location. A group of user profiles identified as regular QSR patrons (e.g., known to visit the QSR location twice per week) may be selected. Within this group an exposed subgroup (e.g., exposed audience) of user profiles that include an indication of exposure to the advertising content may be identified. And a non-exposed subgroup of user profiles may be identified. Advertising effectiveness values may be generated using the techniques discussed herein. For example, user profiles from the exposed subgroup may be paired to similar user profiles from the non-exposed group, behavior information may be determined (e.g., numbers/frequencies of visits to the QSR location before and/or after advertisement exposure), and advertising effectiveness values may be generated based on the behavior information.

In one embodiment, aggregate effectiveness value(s) may be generated. In various embodiments, multiple advertising effectiveness values may be summed, aggregated, added together and/or otherwise combined to generate an aggregate advertising effectiveness value (e.g., a location conversion index). In various embodiments, an aggregate effectiveness value may include an advertising effectiveness value that has been updated based on other advertising effectiveness values. For example, two advertising effectiveness values may be merged/combined to generate a single advertising effectiveness value.

In various embodiments, advertising effectiveness values associated with any number of user profiles may be aggregated to generate the aggregate advertising effectiveness value. An aggregate advertising effectiveness value may represent an increase, decrease, and/or lack of change in a number of visits to retail location as a result of advertising content served to a defined group of users over a period of time. Continuing with the above example, the advertising effectiveness values generated based on the comparisons of the user profiles in the exposed subgroup and the users in the non-exposed subgroup of regular QSR patrons may be aggregated. For example, advertising effectiveness values may be generated for each user in the exposed subgroup and these values may be aggregated to generate an aggregate advertising effectiveness value across the group of regular QSR patrons. In one example, the aggregate advertising effectiveness value may, for example, indicate that the advertising campaign resulted in an increase of two visits per week per user who received the advertisement. In another example, the aggregate advertising effectiveness value may indicate a 25% increase in foot traffic to the QSR location over a defined period of time (e.g., one week before ad exposure compared to one week after ad exposure).

In various embodiments, advertising effectiveness values generated based on a comparison of user profiles exposed to advertising content and randomly-selected user profiles (e.g., not exposed to the ad content) may be included in an aggregate effectiveness value. For example, advertising effectiveness values may be generated based on comparisons of user profiles included in the exposed subgroup of male frequent QSR patrons to randomly-selected user profiles (e.g., not necessarily male frequent QSR patrons). These advertising effectiveness values may be added to an aggregate advertising effectiveness value, but may, for example, be given less weight in the aggregation.

In one embodiment, an aggregate advertising effectiveness value may be adjusted. In various embodiments, an aggregate advertising effectiveness value may be scaled, normalized, and/or otherwise adjusted. For example, advertising effectiveness value(s) may be scaled to a value within a range of values (e.g., 0 to 100), percentage(s), and/or other value(s).

In various embodiments, advertising effectiveness values may include adjustments for natural visit patterns, seasonal visit patterns, events, and/or other factors as a result of the matching processes (e.g., propensity score matching), look-back period determinations, look-forward period determinations, and/or other processes discussed herein. In some embodiments, however, an aggregate advertising effectiveness value (e.g., generated based on one or more advertising effectiveness values) may be adjusted (e.g., post-calculation) to account for natural visit patterns, seasonal visit patterns, events (e.g., current events, weather, etc.), and/or other factors affecting visit rates to a location. For example, an aggregate advertising effectiveness value reflecting ad campaign-driven visits to a retail location may be reduced to account for an increase in natural visits over the holiday season.

In one embodiment, a digital advertisement associated with a location may be generated. In various embodiments, a digital advertisement may include a coupon, a banner advertisement, a pop-up advertisement, embedded advertisement, and/or other promotional content associated with a location (e.g., aimed at driving foot traffic to the location). For example, a digital advertisement may include a coupon for a 20% discount on the purchase of a cup of coffee at a coffee shop.

In one embodiment, advertising effectiveness value(s) may be used to select users to receive the digital advertisement. In various embodiments, advertising effectiveness values may be used to select a type of user that would be most receptive to (e.g., most likely influenced by) the digital advertisement. Continuing with the example, an advertising effectiveness value may have been previously generated indicating that a coupon for a free muffin at the coffee shop resulted in an increased visit frequency of one visit per month among males, between 20-30 years old, with a median salary of $50,000 per year. Another advertising effectiveness value may have been generated indicating that a coupon for a 15% discount on purchase of coffee resulted in an increased visit frequency of two visits per week among males, between 40-50 years old, who regularly attend sporting events. Based on these advertising effectiveness values, user profiles associated with males, between 40-50 years, who are likely to attend sporting events may be selected to receive the digital advertisement.

In one embodiment, a digital advertisement may be provided to mobile device(s) associated with the selected user profiles. In various embodiments, providing digital advertisement to users in a group known to respond favorably to similar advertisement content may increase the return on investment of a mobile advertising campaign.

Further examples and details can be found in U.S. patent application Ser. No. 14/295,067, filed Jun. 3, 2014 and entitled "Measuring Advertising Effectiveness", the entire disclosures of which application is hereby incorporated herein by references.

In general, the users having similar or same profiles, including demographic profile data, behavioral profile data, psycho-graphic profile data, purchase profile data, and/or location profile data, etc., can be grouped as similar users. The similar users can be organized into two groups. One of the two groups is provided with a predetermined content (e.g., an advertisement, an announcement, a notice, a TV program, a direct mail advertisement, etc.); and the other of the two group is not provided with the content. The subsequent user behaviors, such as location patterns, web visitation, service subscription, retail store visitation, etc., can be compared between the groups to identify the influence of the content. In some embodiments, the changes in the user behaviors of the same users before and after the time of the presentation of the content are identified; and the changes are compared between the groups to identify the influence of the content.

FIG. 15 illustrates a data processing system according to one embodiment. While FIG. 15 illustrates various components of a computer system, it is not intended to represent any particular architecture or manner of interconnecting the components. One embodiment may use other systems that have fewer or more components than those shown in FIG. 15.

In FIG. 15, the data processing system (200) includes an inter-connect (201) (e.g., bus and system core logic), which interconnects one or more microprocessors (203) and memory (204). The microprocessor (203) is coupled to cache memory (209) in the example of FIG. 15.

In one embodiment, the inter-connect (201) interconnects the microprocessor(s) (203) and the memory (204) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. In one embodiment, when the data processing system is a server system, some of the I/O devices (205), such as touch screens, printers, scanners, mice, and/or keyboards, are optional.

In one embodiment, the inter-connect (201) includes one or more buses connected to one another through various bridges, controllers and/or adapters. In one embodiment the I/O controllers (207) include a USB (Universal Serial Bus) adapter for controlling USB peripherals, and/or an IEEE-1394 bus adapter for controlling IEEE-1394 peripherals.

In one embodiment, the memory (204) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing device, comprising:
   at least one microprocessor; and
   memory storing instructions configured to instruct the at least one microprocessor to:
   convert, by the computing device, coordinates of locations of a first mobile device at a first plurality of time instances into first identifiers of geographical regions having predefined boundaries;
   determine, by the computing device, visitations of the first mobile device to a geographical region as a function of time based on converting of the coordinates of the locations of the first mobile device into the first identifiers of geographical regions;
   convert, by the computing device, coordinates of locations of a second mobile device at a second plurality of time instances into second identifiers of geographical regions;
   determine, by the computing device, visitations of the second mobile device to the geographical region as a function of time based on converting of the coordinates of the locations of the second mobile device into the second identifiers of geographical regions;
   determine, by the computing device, a difference in visitations to the geographical region, based on:
   the visitations of the first mobile device to the geographical region as a function of time, and
   the visitations of the second mobile device to the geographical region as a function of time.

2. The computing device of claim 1, further configured by the instructions to:
   store, in the computing device, a set of cell identifiers in association with respective identifiers of geographical regions;
   wherein conversion of coordinates of each respective location, among the locations of the first mobile device at the first plurality of time instances and the locations of the second mobile device at the second plurality of time instances, into a respective identifier of a respective geographical region is performed by:
   converting the coordinates of the respective location into a particular cell identifier; and
   looking up, using the particular cell identifier in the set of cell identifiers stored in association with respective identifiers of geographical regions, the respective identifier of the respective geographical region that is associated with the particular cell identifier.

3. The computing device of claim 2, wherein the converting of the coordinates of the respective location into the particular cell identifier includes:
   generating two integers from longitude and latitude coordinates of the respective location according to a precision level; and
   combining the two integers into the particular cell identifier without using a floating point number computation.

4. The computing device of claim 1, wherein the first mobile device is associated with an event and the second mobile device is not associated with the event.

5. The computing device of claim 4, further configured by the instructions to:
   identify the second mobile device based on similarity, between the first mobile device and the second mobile device, in visitation pattern to the geographical region prior to the event.

6. The computing device of claim 5, wherein the second mobile device is identified further based on similarity in user attributes of the first mobile device and the second mobile device.

7. The computing device of claim 6, further configured by the instructions to:
   compute a measurement of influence of the event based on the difference in visitations to the geographical region.

8. The computing device of claim 7, wherein the event includes transmitting of information relevant to the geographical region to the first mobile device; and wherein the information is not transmitted to the second mobile device.

9. A method, comprising:
   converting, by the computing device, coordinates of locations of a first mobile device at a first plurality of time instances into first identifiers of geographical regions having predefined boundaries;
   determining, by the computing device, visitations of the first mobile device to a geographical region as a function of time based on converting of the coordinates of the locations of the first mobile device into the first identifiers of geographical regions;
   converting, by the computing device, coordinates of locations of a second mobile device at a second plurality of time instances into second identifiers of geographical regions;
   determining, by the computing device, visitations of the second mobile device to the geographical region as a function of time based on converting of the coordinates of the locations of the second mobile device into the second identifiers of geographical regions;
   calculating, by the computing device, a difference in visitations to the geographical region, based on:
   the visitations of the first mobile device to the geographical region as a function of time, and
   the visitations of the second mobile device to the geographical region as a function of time.

10. The method of claim 9, further comprising:
    storing, in the computing device, a set of cell identifiers in association with respective identifiers of geographical regions;
    wherein converting of coordinates of each respective location, among the locations of the first mobile device at the first plurality of time instances and the locations of the second mobile device at the second plurality of time instances, into a respective identifier of a respective geographical region includes:
    converting the coordinates of the respective location into a particular cell identifier; and
    looking up, using the particular cell identifier in the set of cell identifiers stored in association with respective identifiers of geographical regions, the respective identifier of the respective geographical region that is associated with a cell identifier that matches the particular cell identifier.

11. The method of claim 10, wherein the converting of the coordinates of the respective location into the particular cell identifier is performed without using a floating point number computation.

12. The method of claim 9, further comprising:
    identifying the second mobile device based on similarity, between the first mobile device and the second mobile device, in a set of attributes.

13. The method of claim 12, wherein the set of attributes includes:

visitation pattern to the geographical region prior to an event; and attributes of users the first mobile device and the second mobile device; and wherein the method further includes:

calculating a measurement of influence of the event based on the difference in visitations to the geographical region.

14. The method of claim 13, wherein the event includes transmission of information relevant to the geographical region to the first mobile device without transmitting the information to the second mobile device.

15. A non-transitory computer storage medium storing instructions configured to instruct a computing device to perform a method, the method comprising:

dividing, by the computing device, a group of mobile devices into a first subset of mobile devices and a second subset of mobile devices;

converting, by the computing device, coordinates of locations of a group of mobile devices into identifiers of geographical regions having predefined geographical boundaries;

determining, by the computing device, visitations of the mobile devices to the geographical regions as a function of time based on the converting of the coordinates to the identifiers;

identifying, by the computing device from a group of mobile devices, a second subset of the group of mobile devices based on similarity in attributes associated with mobile devices in the second subset and corresponding attributes associated with mobile devices in a first subset of the group of mobile devices, wherein the mobile devices in the first subset are associated with an event related to a geographical region and the mobile devices in the second subset are not associated with the event;

calculating, by the computing device, a difference, between the first subset and the second subset, in visitation patterns to the geographical region after the event.

16. The medium of claim 15, wherein the method further comprises:

storing, in the computing device, a set of cell identifiers in association with respective identifiers of geographical regions;

wherein converting of coordinates of each respective location, among the locations of the group of mobile devices, into a respective identifier of a respective geographical region includes:

converting the coordinates of the respective location into a particular cell identifier; and looking up, using the particular cell identifier in the set of cell identifiers stored in association with respective identifiers of geographical regions, the respective identifier of the respective geographical region that is associated with a cell identifier that matches the particular cell identifier.

17. The medium of claim 16, wherein the converting of the coordinates of the respective location into the particular cell identifier includes:

Generating, from longitude and latitude coordinates of the respective location, a row identifier and a column identifier in a grid reference system according to a precision level; and combining the row identifier and the column identifier to generate the particular cell identifier in the grid reference system.

18. The medium of claim 15, wherein the corresponding attributes associated with the mobile devices in the first subset include:

attributes of users of the mobile devices in the first subset; and visitations of the mobile devices to the geographical region before the event.

19. The medium of claim 18, further comprising:

calculating a measurement of influence of the event based on the difference in visitations to the geographical region.

20. The medium of claim 19, wherein the event includes transmission of information relevant to the geographical region to the mobile devices in the first subset without transmission of the information to the mobile devices in the second subset.

* * * * *